US012756352B2

(12) United States Patent
Mapati et al.

(10) Patent No.: US 12,756,352 B2
(45) Date of Patent: Oct. 6, 2026

(54) SOLAR TRACKER SYSTEMS AND METHODS INCLUDING A PANEL MOUNTING ASSEMBLY

(71) Applicant: FTC Solar, Inc., Austin, TX (US)

(72) Inventors: Anurag Mapati, Hyderabad (IN); Pradeep Kumar Dube, Hyderabad (IN)

(73) Assignee: FTC Solar, Inc., Austin, TX (US)

( * ) Notice: Subject to any disclaimer, the term of this patent is extended or adjusted under 35 U.S.C. 154(b) by 0 days.

(21) Appl. No.: 18/826,323

(22) Filed: Sep. 6, 2024

(65) Prior Publication Data

US 2025/0088141 A1 Mar. 13, 2025

(30) Foreign Application Priority Data

Sep. 7, 2023 (IN) ............................. 202311060173

(51) Int. Cl.
*H02S 20/32* (2014.01)
*H02S 30/10* (2014.01)

(52) U.S. Cl.
CPC .............. *H02S 20/32* (2014.12); *H02S 30/10* (2014.12)

(58) Field of Classification Search
CPC ................................. H02S 20/32; H02S 30/10
See application file for complete search history.

(56) References Cited

U.S. PATENT DOCUMENTS

2017/0294870 A1* 10/2017 Almy ...................... F24S 25/63
2022/0271706 A1* 8/2022 Creasy .................... H02S 30/10

OTHER PUBLICATIONS

First Solar Series 7 TR1 Module—User Guide; MPD-00752-07-US, Rev. 1.2, pp. 1-28.

* cited by examiner

*Primary Examiner* — Jayne L Mershon
(74) *Attorney, Agent, or Firm* — Armstrong Teasdale LLP

(57) ABSTRACT

A mounting assembly for securing a solar panel assembly to a rotatable tube of a solar tracker includes a saddle having a first sidewall, a second sidewall, and a base wall extending between the first sidewall and the second sidewall. The solar panel assembly includes a support rail on a back side of the solar panel assembly defining a slot. The sidewalls define a gap sized to receive the support rail. A clip assembly is sized to extend around the rotatable tube and includes a clip and a cam plate. A locking device is connected to the clip assembly, is shaped to engage the first sidewall and the second sidewall, and is insertable into the slot in the support rail to connect the clip assembly to the support rail. The cam plate is shaped to receive the clip under tension and clamp the support rail to the rotatable tube.

15 Claims, 41 Drawing Sheets

SOLAR TRACKER SYSTEMS AND METHODS INCLUDING A PANEL MOUNTING ASSEMBLY

CROSS-REFERENCE TO RELATED APPLICATION

This application claims priority to Indian Patent Application No. 202311060173, filed Sep. 7, 2023, the entire contents of which are incorporated herein by reference.

FIELD

The field relates generally to systems and methods for solar tracking and for securing solar photovoltaic (PV) panels on a solar array.

BACKGROUND

Solar arrays are devices that convert light energy into other forms of useful energy (e.g., electricity or thermal energy). One example of a solar array is a photovoltaic (PV) array that converts sunlight into electricity. Some photovoltaic arrays are configured to follow or track the path of the sun to minimize the angle of incidence between incoming sunlight and the photovoltaic array.

Photovoltaic arrays include a plurality of PV panels that are attached to a rotatable tube. A drive rotates the tube to move the panels when tracking the path of the sun. A support structure is generally used to mount the panels on the tube and the support structure is attached to the tube. Known attachments for panel support structures typically use fasteners, which can increase the complexity and time for assembling the arrays. Accordingly, a need exists for systems for attaching panel support structures to the tubes which secure the panels in position on the tube against loads acting on the panels during normal use, and which may be efficiently installed and/or adjusted without the use of specialized tooling and/or loose fastening components.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a mounting assembly for securing a solar panel assembly to a rotatable tube of a solar tracker includes a saddle having a first sidewall, a second sidewall, and a base wall extending between the first sidewall and the second sidewall. The solar panel assembly includes a support rail on a back side of the solar panel assembly defining a slot. The first sidewall and the second sidewall define a gap sized to receive the support rail. The mounting assembly further includes a clip assembly sized to extend around the rotatable tube, the clip assembly including a clip and a cam plate, and a locking device connected to the clip assembly. The locking device is shaped to engage the first sidewall and the second sidewall and is insertable into the slot in the support rail to connect the clip assembly to the support rail. The cam plate is shaped to receive the clip under tension and clamp the support rail to the rotatable tube.

In another aspect, a solar tracker system includes a rotatable tube defining a longitudinal axis, a solar panel module including a support rail on a back side of the solar panel module, and a mounting assembly securing the solar panel module to the rotatable tube. The support rail includes a slot. The mounting assembly includes a saddle including a first sidewall, a second sidewall, and a base wall extending between the first sidewall and the second sidewall. The first sidewall and the second sidewall defining a gap sized to receive the support rail. The mounting assembly further includes a clip assembly sized to extend around the rotatable tube including a clip and a cam plate, and a locking device connected to the clip assembly and shaped to engage the first sidewall and the second sidewall. The locking device is insertable into the slot in the support rail to connect the clip assembly to the support rail. The cam plate is shaped to receive the clip under tension and clamp the support rail to the rotatable tube.

In yet another aspect, a solar tracker system includes a rotatable tube defining a longitudinal axis, a solar panel assembly including a support rail on a back side of the solar panel assembly, and a mounting assembly securing the solar panel assembly to the rotatable tube. The mounting assembly includes a hanger connected to the support rail and a body connected to the hanger. The body defines a body opening shaped complementary with a profile of the rotatable tube. The body includes a hinged pivot point that is adjustable to change at least one of a size and a shape of the opening to clamp the body on the rotatable tube.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
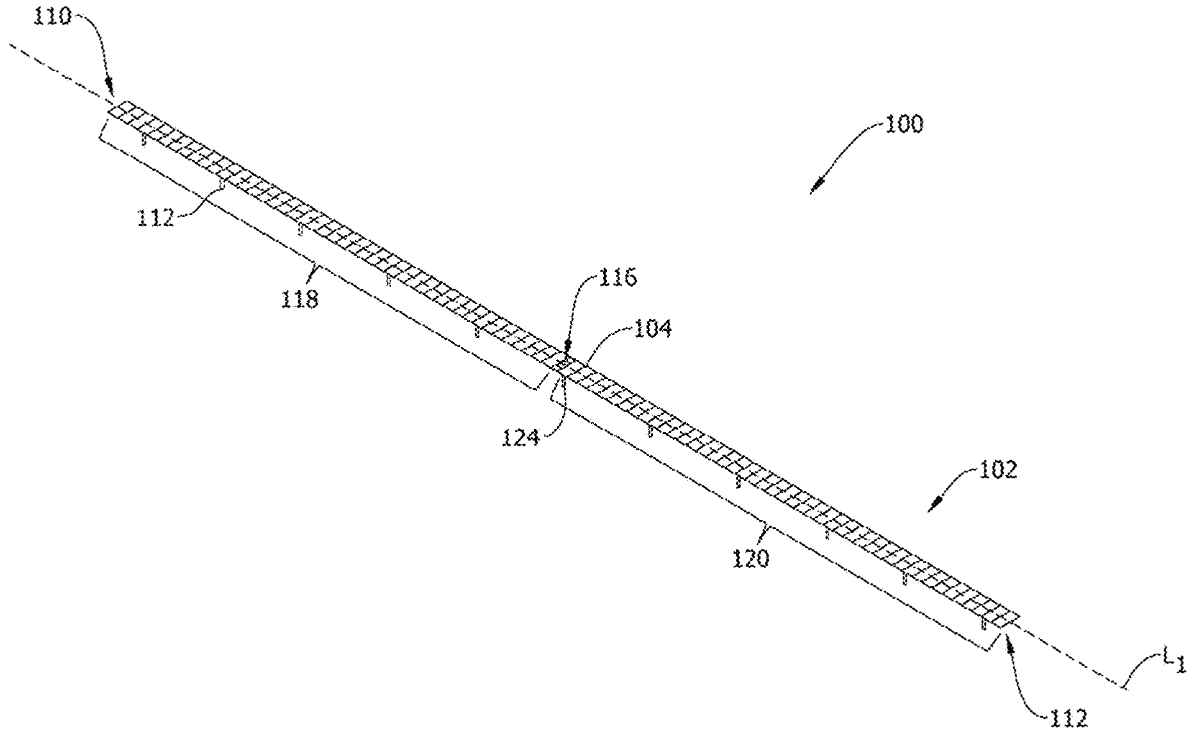
FIG. 1 is a perspective view of a solar tracker system including a solar array row.

An example solar tracker system 100 including a photovoltaic (PV) solar array row 102 (alternatively referred to herein as an "array" or a "row") is shown in FIG. 1. The solar tracker system 100 and array row 102 is suitably used in a solar power generation system. The solar array row 102 is used to generate power, typically in combination with a plurality of similarly arranged solar array rows 102 of the solar tracker system 100 (not all rows 102 shown). The solar array row 102 includes a plurality of solar panel assemblies 104. Each solar panel assembly 104 extends between a back or bottom side 106 (shown in FIG. 2) and a panel side 108 (shown in FIG. 3). The solar array row 102 defines a longitudinal axis Li extending between the first and second longitudinal ends 110, 112 of the row 102.

The solar array row 102 is a one-panel or "1P" row 102 (terms used interchangeably herein), in that it includes a row 102 of single solar panel assemblies 104 attached to a torque tube 130 114 (shown in FIG. 2) sequentially along the longitudinal axis Li at a transverse midpoint of the panel assemblies 104. In other embodiments, the solar array row 102 may be a two-panel or "2P" row 102 that includes two rows 102 of panel assemblies 104 attached to the torque tube 130 114, and each extending in opposed directions outwards from the torque tube 130 114 in two rows 102 of panels.

Referring to FIG. 1, the solar array row 102 includes a drive 116 for rotating the panel assemblies 104 about the longitudinal axis Li. The solar array row 102 defines a first section 118 extending from the first end 110 of the solar array row 102 to the drive 116 and a second section 120 extending from the drive 116 to the second, opposed end 112 of the solar array row 102. The drive 116 is positioned substantially longitudinally in or near the middle of the solar array row 102. In other embodiments, the solar array row 102 may include multiple drives 116.

The solar array row 102 includes a plurality of posts 122 and the torque tube 130 (shown in FIG. 3) to which the solar panel assemblies 104 are connected. The plurality of posts 122 includes a central post 124 that supports the drive 116. The torque tube 130 114 is rotatably connected to each of the posts 122 to enable rotation of the solar panel assemblies 104 about the longitudinal axis Li. As shown, the posts 122 are suitably I-beam posts but other types of posts may be used. In the example, the solar array row 102 includes 11 posts 122, including the central post 124 and ten additional posts 122 that are symmetrically arranged on opposed sides of the central post 124. In other embodiments, the solar array row 102 may include any suitable number of posts 122.

The posts 122 may be connected to a base (not shown) for securing the row 102 in a solar array field or any other suitable tracking environment. Generally, the base may include any structure that anchors the row 102, for example a stanchion, ram, pier, ballast, post or the like. The base may also include a foundation that encases a portion of the posts 122 or may include brackets, fasteners or the like that connect to the posts 122. In other embodiments, the row 102 may be connected to another structure that supports the solar panel assemblies 104 (e.g., roof-top applications).

The solar panel assemblies 104 of this embodiment are a photovoltaic (PV) array. In other embodiments, the solar panel assemblies 104 may include a thermal collector that heats a fluid such as water. In such embodiments, the panel assemblies 104 may include tubes of fluid (not shown)

which are heated by solar radiation. While the present disclosure may describe and show a photovoltaic array, the principles disclosed herein are also applicable to a solar array configured as a thermal collector unless stated otherwise.

The drive 116 is selectively controllable to rotate the torque tube 130 114 such that the panel assemblies 104 follow the path of the sun, such as during movement of the sun over a course of a day. For example, the drive 116 rotates the panel assemblies 104 such that a plane of array (i.e., a plane that is coplanar with the panel side 108 of the panel assemblies) is substantially perpendicular to a direction of sunlight directed at the panels throughout the day. In some methods, the panel assemblies 104 are positioned based on seasonal variations in the position of the sun. The solar array row 102 may be a single axis tracker or a dual axis tracker with the torque tube 130 (shown in FIG. 3) defining at least one axis of rotation of the array 102. The other axis of rotation may be a vertical axis with rotation being achieved by a rotatable coupling and, optionally, a second drive 116 (not shown).

The solar array row 102 further includes a row controller (not shown) for controlling operation of the drive 116. The row controller is a portable controller which may be removably attached to the solar array row 102, near the drive 116. The controller may be used on other tracker systems, including tracker systems that have a different configuration of panels (e.g., 2P systems) and/or number of posts 122.

Figure 2:
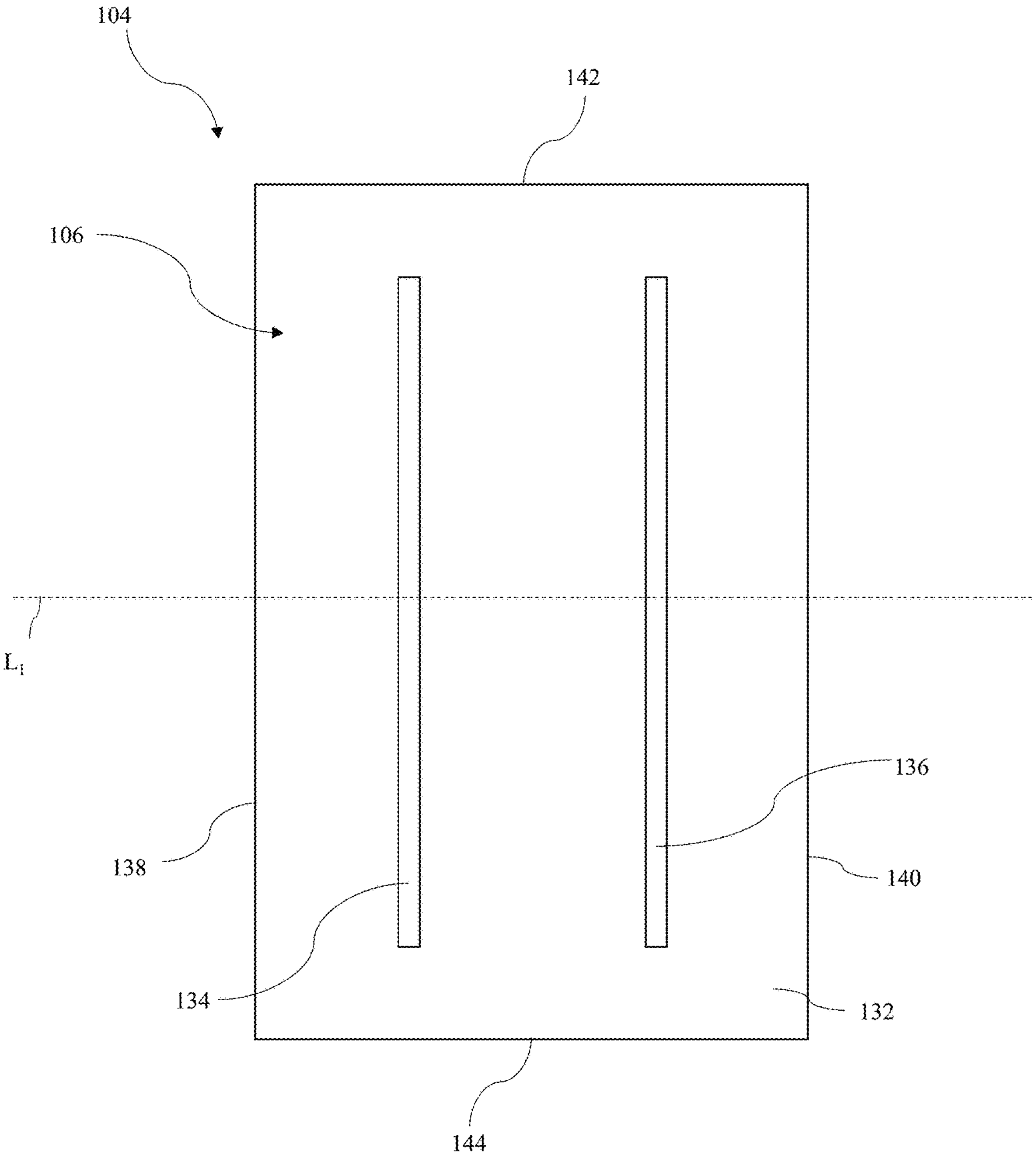
FIG. 2 is a bottom view of a solar panel assembly of the tracker system of FIG. 1.

FIG. 2 shows a back side 106 of a solar panel assembly 104 of the solar panel system 100 shown in FIG. 1. The front sides 108 (shown in FIG. 3) of the panel assembly 104 include the PV cells. The back side 106 of the panel assembly 104 is positioned opposite the front side 108. The panel assembly 104 includes a back wall 132 and module rails 134, 136 which extend downward from the back surface (i.e., out of the page in FIG. 2). The panel assembly 104 includes two module rails 134, 136 that are positioned inward of longitudinally spaced sides 138, 140 of the module. The module rails 134, 136 in the example embodiment extend transversely (i.e., perpendicular to the longitudinal axis Li) across the panels from transverse ends 142, 144 of the panel 104.

Figure 3:
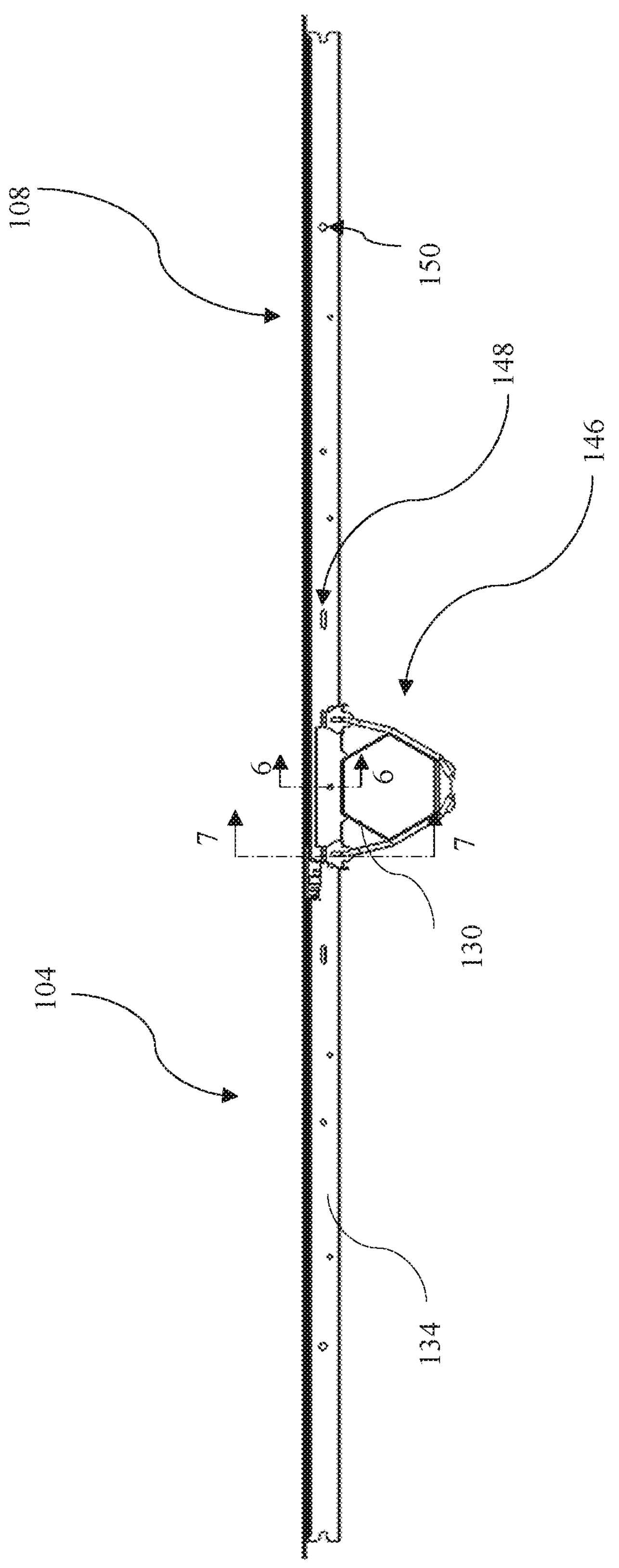
FIG. 3 is a side view of the panel assembly shown in FIG. 2 and a mounting assembly for connecting the panel assembly to a torque tube of the solar tracker system shown in FIG. 1.

FIG. 3 is an end view showing a mounting assembly 146 for mounting the panel assembly 104, and more specifically, the module rails 134, 136 of the panel assembly 104 shown in FIG. 2, to the torque tube 130 of the solar tracker system 100 shown in FIG. 1. The mounting assembly 146 is partially seated on the torque tube 130 and engages the module rail 134 to clamp the module rail 134 into position on the torque tube 130. As shown in FIG. 3, the module rail 134 includes elongated slots 148 and guide apertures 150 positioned transversely spaced along a length of the rail 134.

Figure 4:
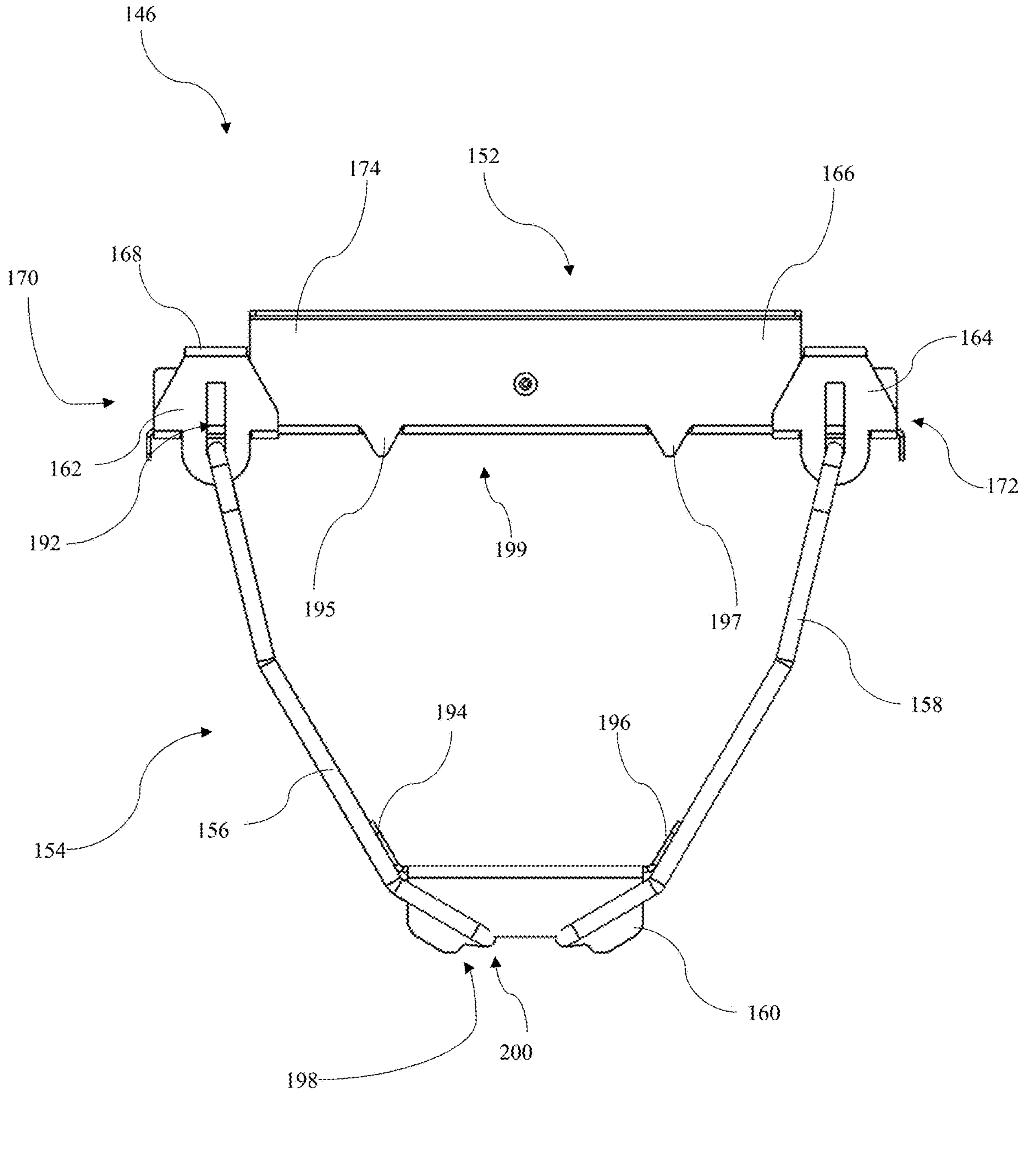
FIG. 4 is a side view of the mounting assembly shown in FIG. 3.

Referring to FIG. 4, the mounting assembly 146 includes a bracket assembly 152 and a clip assembly 154. The clip assembly 154 includes a pair of clips 156, 158 and a cam plate 160. The bracket assembly 152 includes a pair of locking devices 162, 164 and a saddle mount 166.

The saddle mount 166 is shaped to be seated on the torque tube 130. The saddle mount includes a pair of projections 195, 197 that project downward and define a recess 199 between the projections 195, 197. The recess 199 is sized to receive a portion of the torque tube 130 (shown in FIG. 3) with the projections 195, 197 contacting the torque tube 130.

Figure 8:
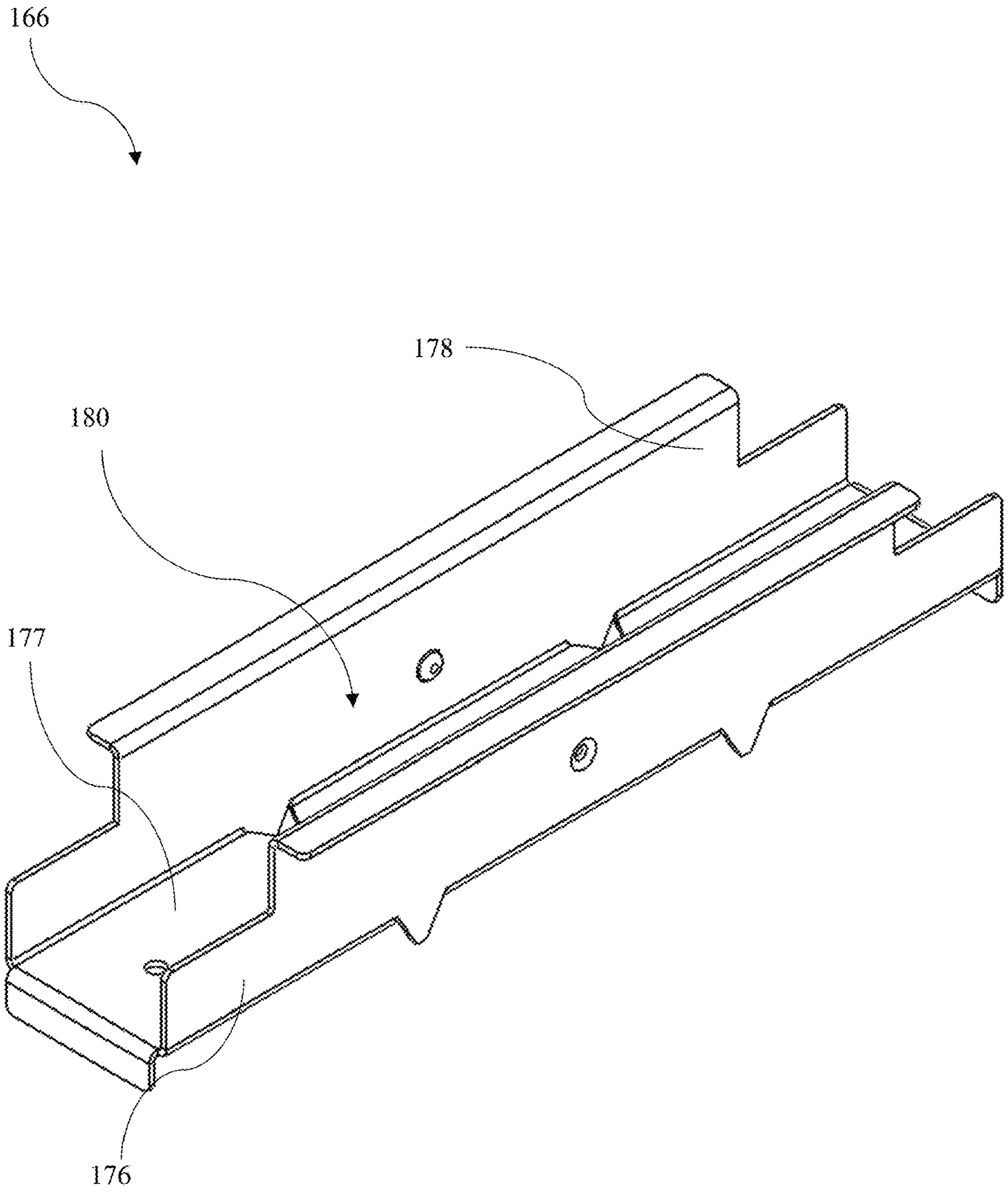
FIG. 8 is a perspective view of a saddle mount of the mounting assembly shown in FIG. 3.
Figure 9:
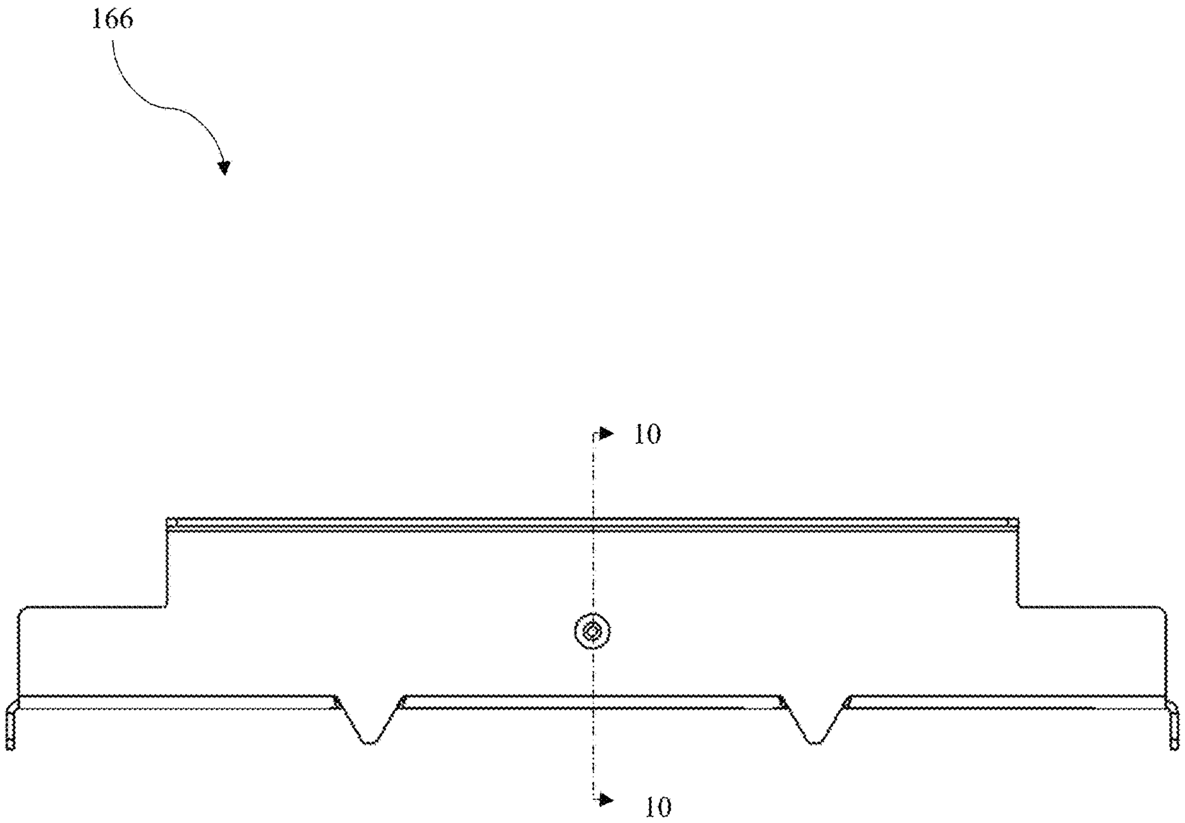
FIG. 9 is a side view of the saddle mount shown in FIG. 8.
Figure 10:
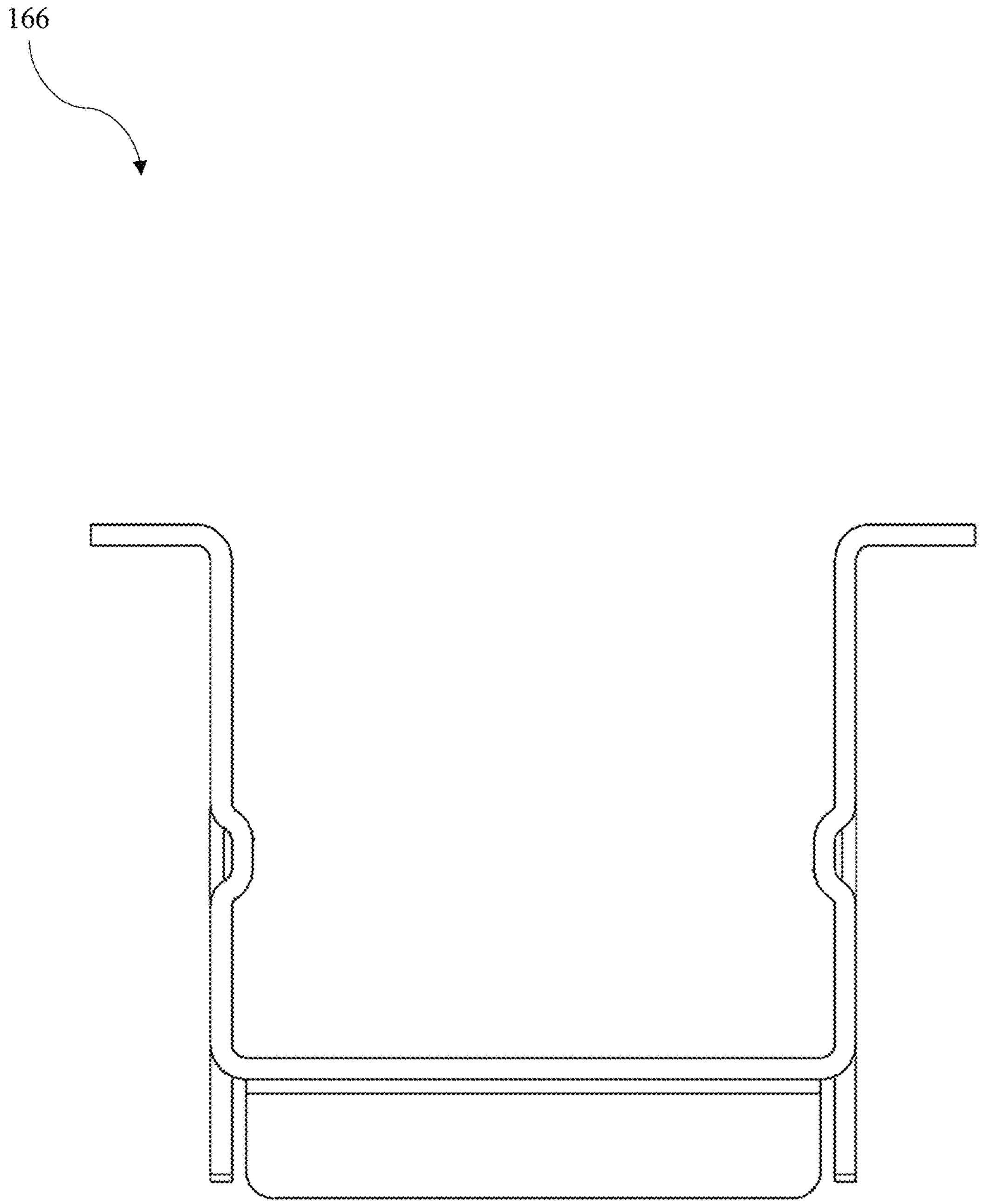
FIG. 10 is a section view of the saddle mount shown in FIG. 8, taken along the line 10-10, shown in FIG. 9.
Figure 11:
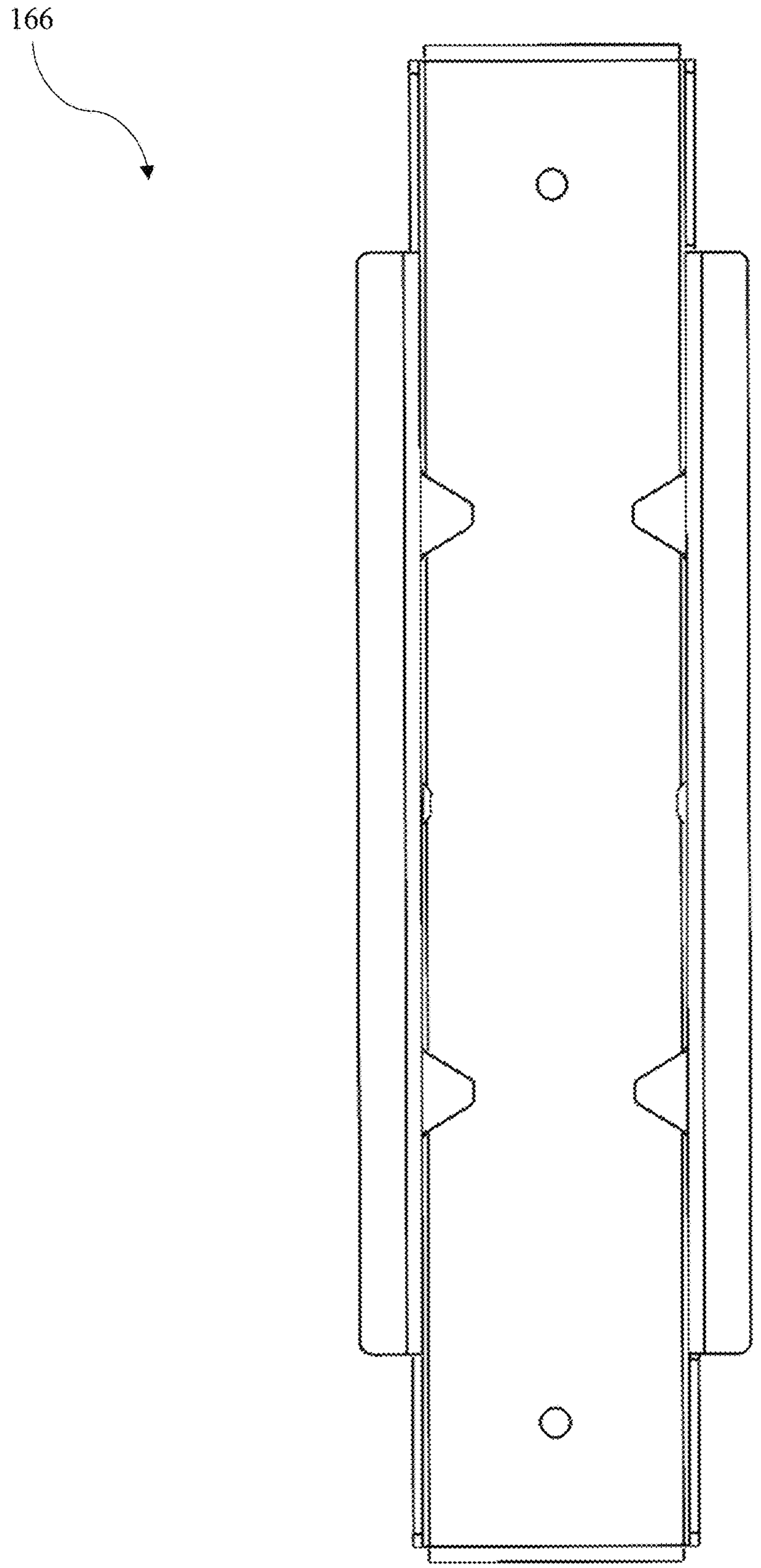
FIG. 11 is a top view of the saddle mount shown in FIG. 8.

As shown in FIG. 8, the saddle mount 166 includes a first sidewall 176, a second sidewall 178, and a base wall 177 extending from the first sidewall 176 to the second sidewall 178. The first sidewall 176 and the second sidewall 178 define a gap 180 therebetween. The gap 180 is sized to receive the support rail 134 (shown in FIG. 3).

Referring back to FIG. 4, the locking devices 162, 164 each are positioned partially beneath the saddle mount 166 and extend along sides of the saddle mount 166 to a hook 168. The hook 168 is shaped to be received within one of the elongate slots 148 of the module rail 134 (shown in FIG. 3). The saddle mount 166 is further sized in correspondence with (or complementary with) a spacing of the elongate slots 148 on the module rail 134 such that the hooks 168 are each aligned with the slots 148 on the rail 134 when positioned on the saddle mount 166. The locking devices 162, 164 are identical and are made of a sheet metal in the example though in other embodiments may be made of any suitable material.

The bracket assembly 152 includes two locking devices 162, 164 positioned at opposed transverse ends 170, 172 of the saddle mount 166. The hook portions 168 of the locking devices 162, 164 each extend, in part, above the saddle mount 166 and are positioned to abut an intermediate portion 174 of the saddle 166.

Figure 5:
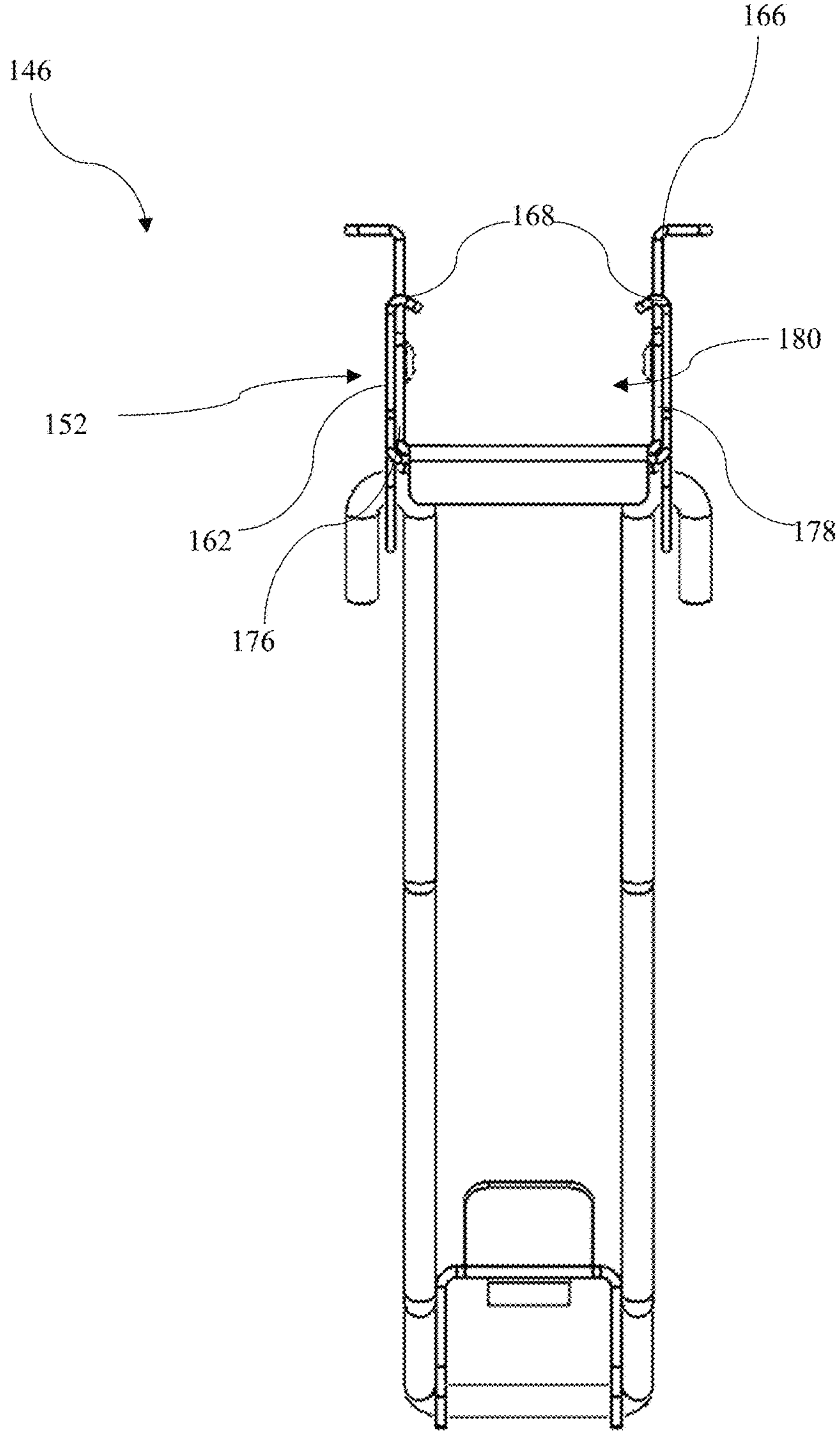
FIG. 5 is an end view of the mounting assembly shown in FIG. 3.
Figure 12:
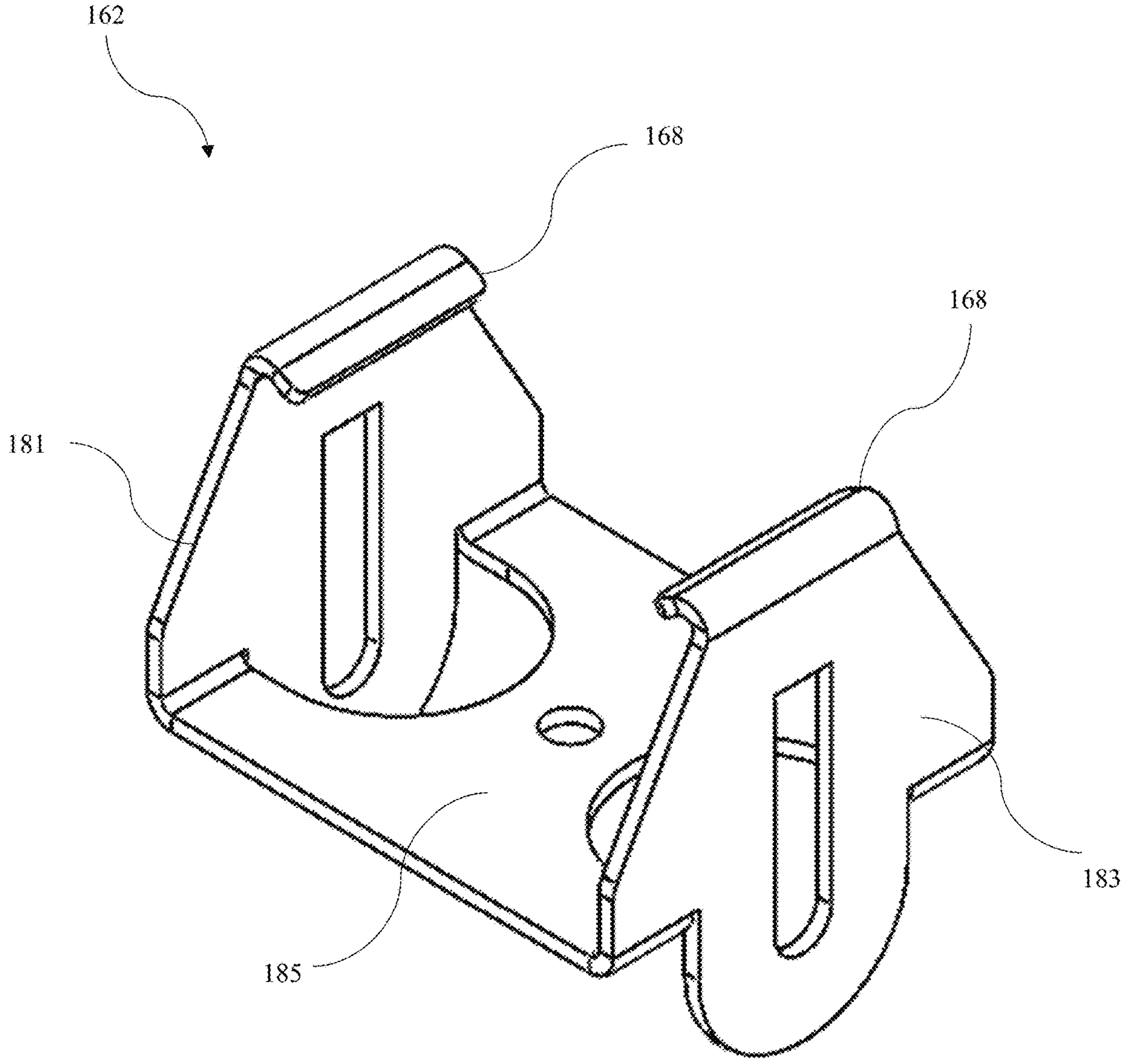
FIG. 12 is a perspective view of a locking device of the mounting assembly shown in FIG. 3.

FIG. 5 shows an end view of the mounting assembly 146. As shown in FIG. 5, the locking device 162 includes two hooks 168 (alternatively referred to herein as "distal tips") positioned on longitudinally opposed sidewalls 176, 178 of the saddle mount 166. The locking device 162 is shaped to engage the first sidewall 176 and the second sidewall 178. As best shown in FIG. 12, the locking device 162 includes a base wall 185 connecting a pair of opposed sidewalls 181, 183 (alternatively referred to herein as a "stop"). The hooks 168 extend obliquely relative to the respective sidewalls 181, 183. The locking device 162 is sized to slidably extend around the saddle mount 166 with the base wall 185 contacting the base wall 177 (shown in FIG. 8) and each of the sidewalls 181, 183 contacting the sidewalls 176, 178 of the saddle 166.

Figure 6:
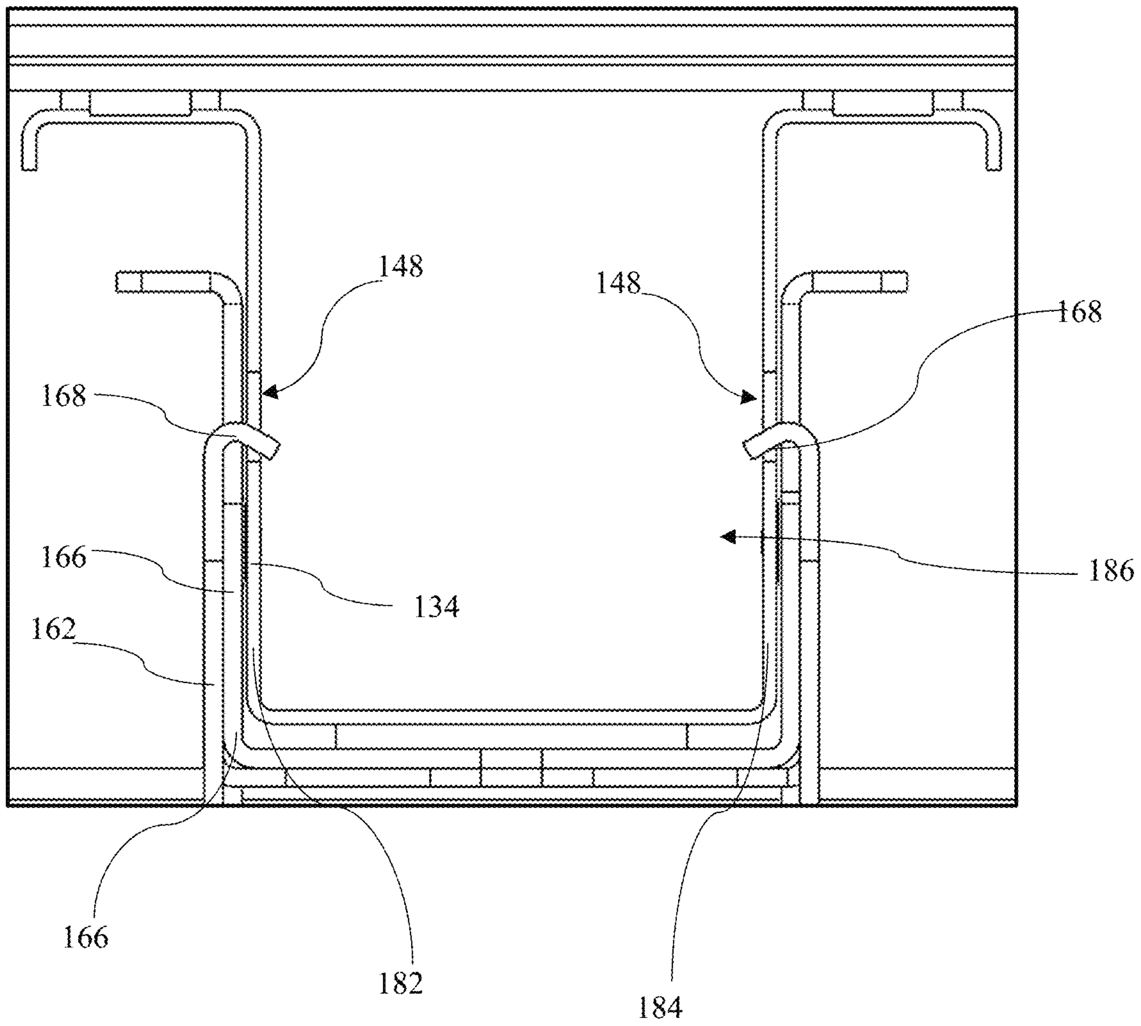
FIG. 6 is a cross section showing the mounting assembly of FIG. 3 and taken along the line 6-6, shown in FIG. 3.

FIG. 6 is a cross section taken along the line 6-6, shown in FIG. 3. As shown in FIG. 6, the two hooks 168 of the locking device 162 extend through and engage different elongate slots 148 defined in opposed sidewalls 182, 184 of the module rail 134. The hooks 168 are each curved downward through the slots 148 and extend into an internal recess 186 defined within the module rail 134.

Figure 7:
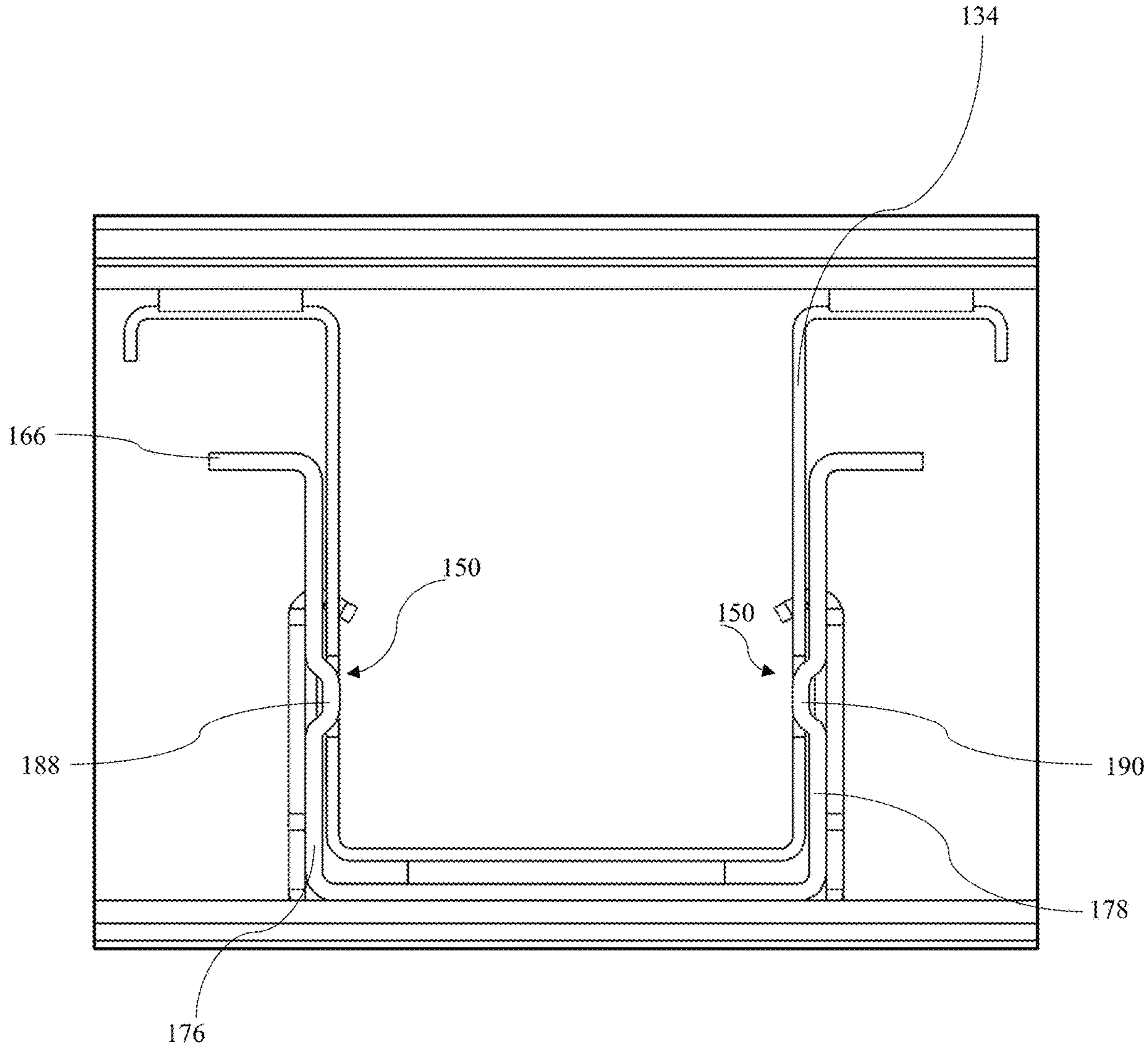
FIG. 7 is a cross section showing the mounting assembly of FIG. 3 and taken along the line 7-7, shown in FIG. 3.

FIG. 7 is a cross section taken along the line 7-7, shown in FIG. 3. As shown in FIG. 7, the saddle mount 166 includes dimples 188, 190 on each on one of the sidewalls 176, 178. The dimples 188, 190 each project inward (i.e., towards one another) on the sidewalls 176, 178. The dimples 188, 190 are each positioned in alignment at a central position along a transverse length of the saddle mount 166. The dimples are sized in correspondence with (or complementary with) the guide apertures 150 of the module rail 134, shown in FIG. 3. The dimples 188, 190 provide a guide for aligning the saddle mount 166 transversely on the rail 134 such that the hooks 168 are aligned with the elongated slots 148 (shown in FIG. 6).

Referring back to FIG. 4, the locking devices 162, 164 include slots 192 that receive and secure portions of the clips 156, 158 therein to connect the clip assembly 154 to the locking devices 162, 164. The clips 156, 158 are made of spring steel and extend to the cam plate 160, which is sized to be positioned on a lower surface of the torque tube 130 opposite the saddle mount 166.

The cam plate 160 is suitably held on the torque tube 130 by a tension force exerted on the cam plate 160 by the clips 156, 158. The cam plate 160 includes a pair of wings 194, 196, that flare out to distal ends of the cam plate 160 and contact opposed side surfaces of the torque tube 130. The cam plate 160 defines a pair of installation notches 198 and lock notches 200. The lock notches 200 are each positioned inward on the cam plate 160 relative to the installation notches 198.

As shown in FIG. 4, the clips 156 are each received, under or with a tension force, in a respective one of the lock notches 200. The notches 198, 200 enable adjustment of the tension force in the clips 156, 158, and thereby adjustment of a clamping force exerted by the mounting assembly 146. The locking devices 162, 164, the module rail 134, and the clip assembly 154 cooperate such that fastening of the clip assembly 154 by positioning the clips 156, 158 in the lock notches 200, as shown in FIG. 4, clamps the panel assembly 104 to the torque tube 130 (shown in FIG. 3). The pulling force provided by the clip assembly 154 is directed to the module rail 134 since the locking devices 162, 164 are engaged at opposed ends with both the clips 156, 158 and the module rail 134.

During assembly, the saddle mount 166 is positioned on the module rail 134 of the panel using the guide dimples 188, 190 (shown in FIG. 7). The locking devices 162, 164 are locked into position by inserting the hooks 168 through the elongate slots 148 on the module rail 134. The panel assembly 104 may then be lifted on the torque tube 130, with one of the clips 156, 158 subsequently being moved into the cam plate 160 to lock the mounting assembly 146 and the panel 104 in position on the torque tube 130. By installing the mounting assembly 146 on the panel assembly prior to connecting the mounting assembly 146 to the torque tube 130, the mounting assembly 146 may be more easily positioned on the torque tube 130 using the panels as reference for the necessary spacing. Additionally, the mounting assembly 146 attaches the module rail 134 to the torque tube 130 without the use of threaded fasteners (e.g., nuts, bolts, etc.) or other tooling.

Figure 13:
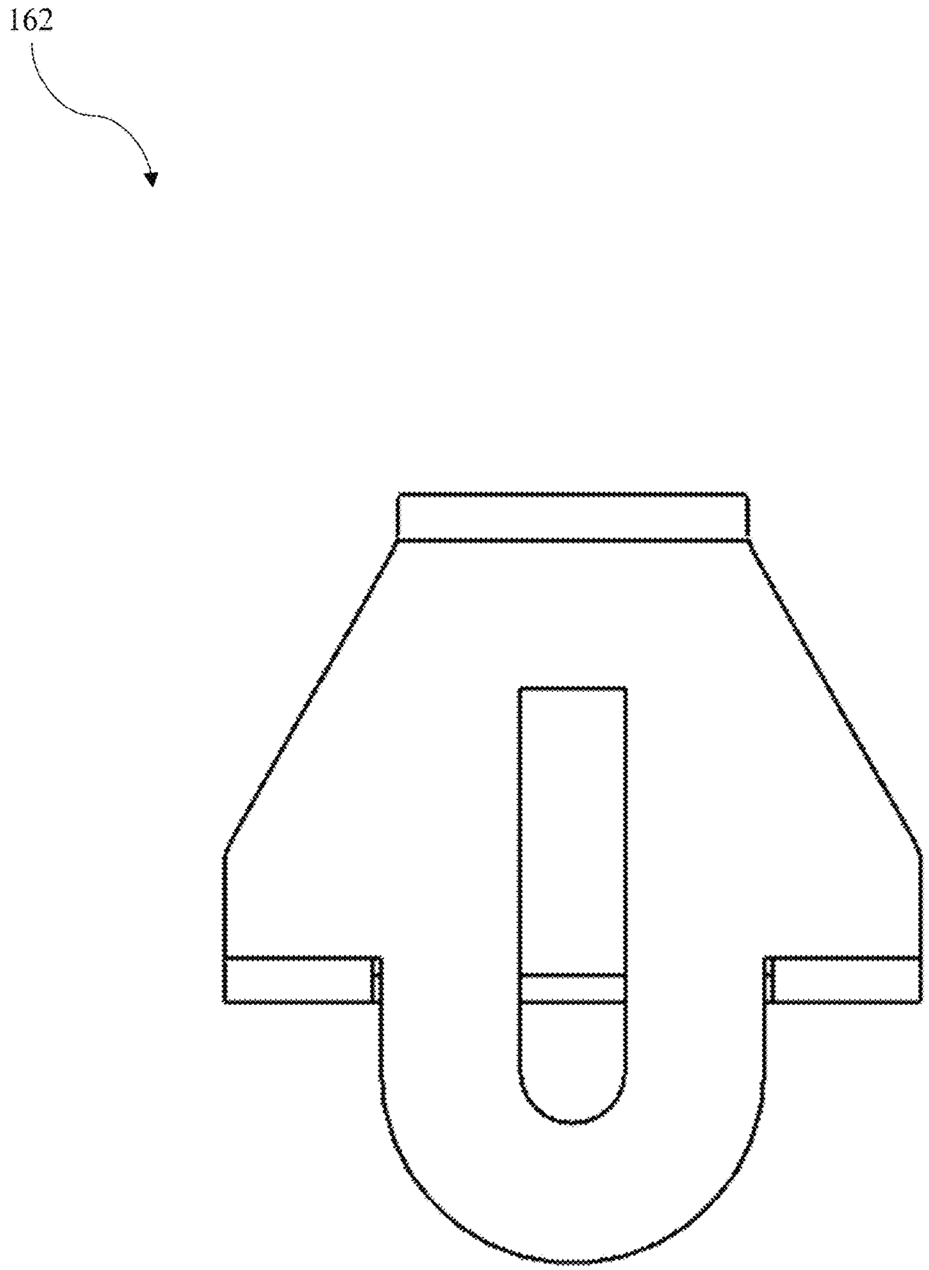
FIG. 13 is a side view of the locking device shown in FIG. 12.
Figure 14:
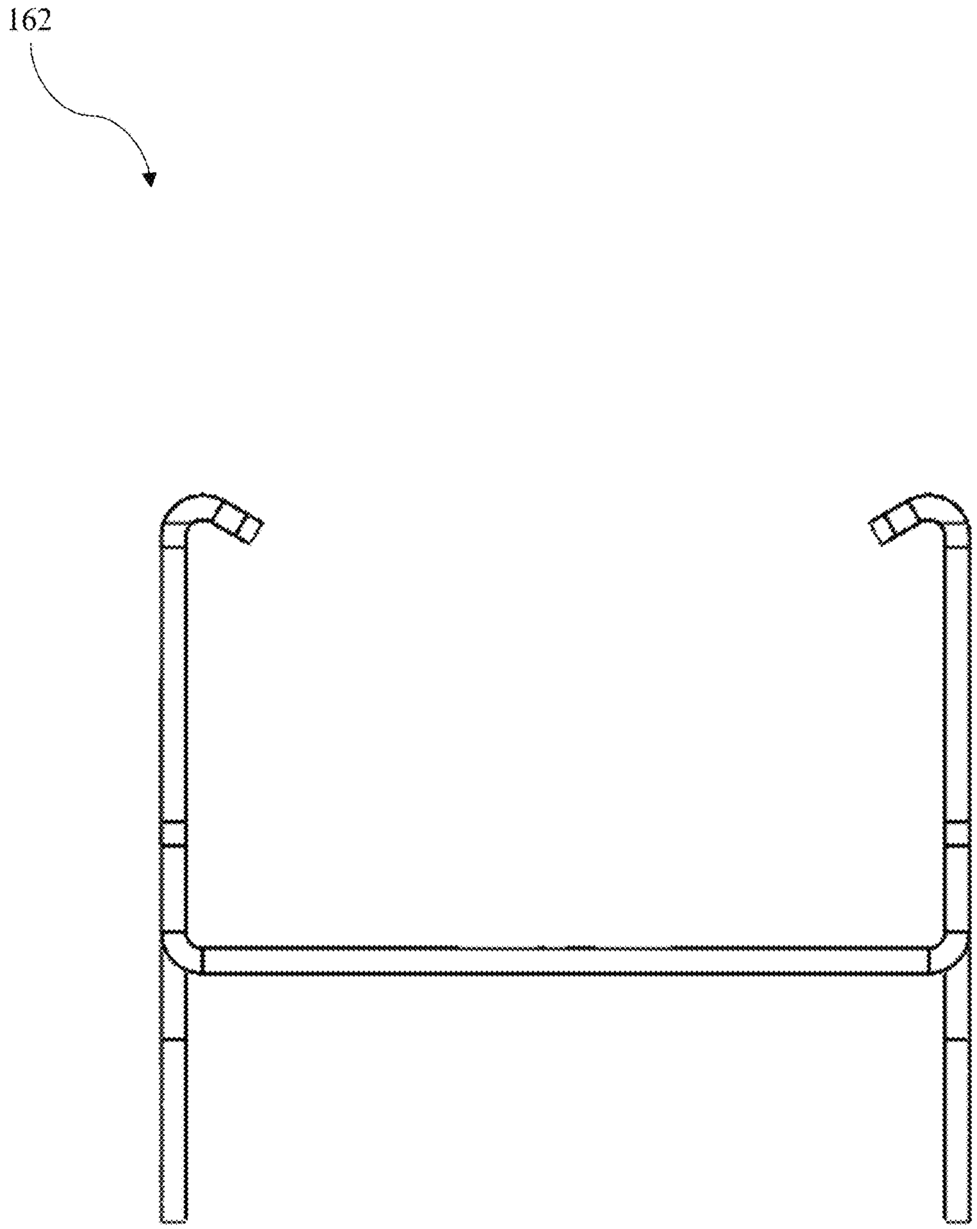
FIG. 14 is an end view of the locking device shown in FIG. 12.

FIGS. 8-11 show additional views of the saddle mount 166. FIGS. 12-14 show additional views of the locking device 162.

Figure 15:
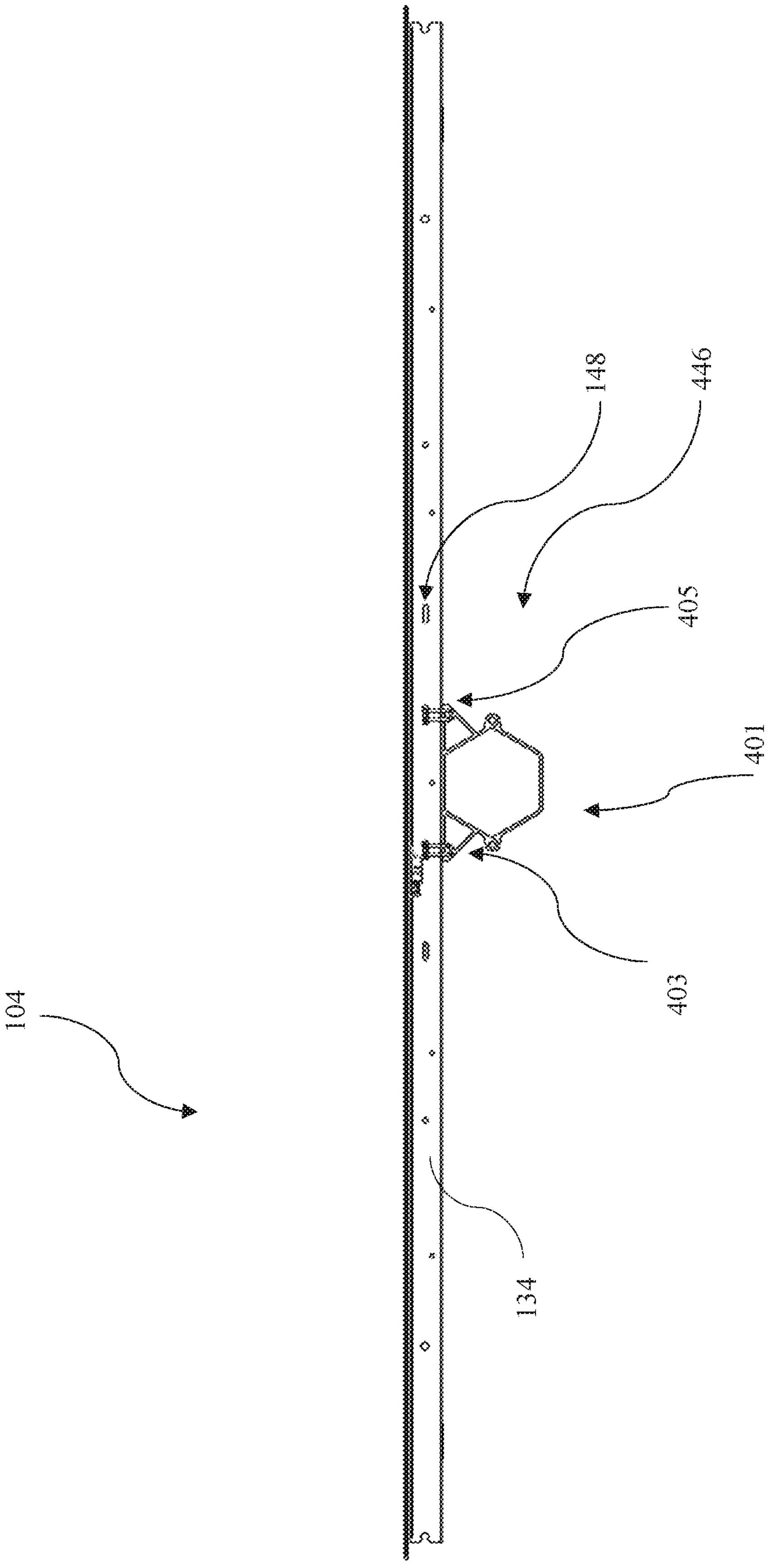
FIG. 15 is a side view of the panel assembly shown in FIG. 2 and another embodiment of a mounting assembly for connecting the panel assembly to a torque tube of the solar tracker system shown in FIG. 1.

FIGS. 15-36 show an alternative mounting assembly 446 for mounting the module rail 134 on the torque tube 130 (shown in FIG. 3). Referring to FIG. 15, the solar panel assembly 404 is shown. The panel assembly 404 is substantially the same as the panel assembly 104, shown in FIG. 3, except that the panel assembly 104 includes the alternative mounting assembly 146. The module rail 134 and panel module XXX are substantially the same as the rail 134 and panel module XXX shown in FIG. 3.

Referring to FIG. 15, the mounting assembly 146 includes a clamping assembly 401 and a pair of hangers 403, 405 which attach the clamping assembly 401 to the module rail 134, shown in FIG. 15. The mounting assembly 146 includes two hangers 403, 405 at opposed transverse ends of the clamping assembly 401.

Figure 16:
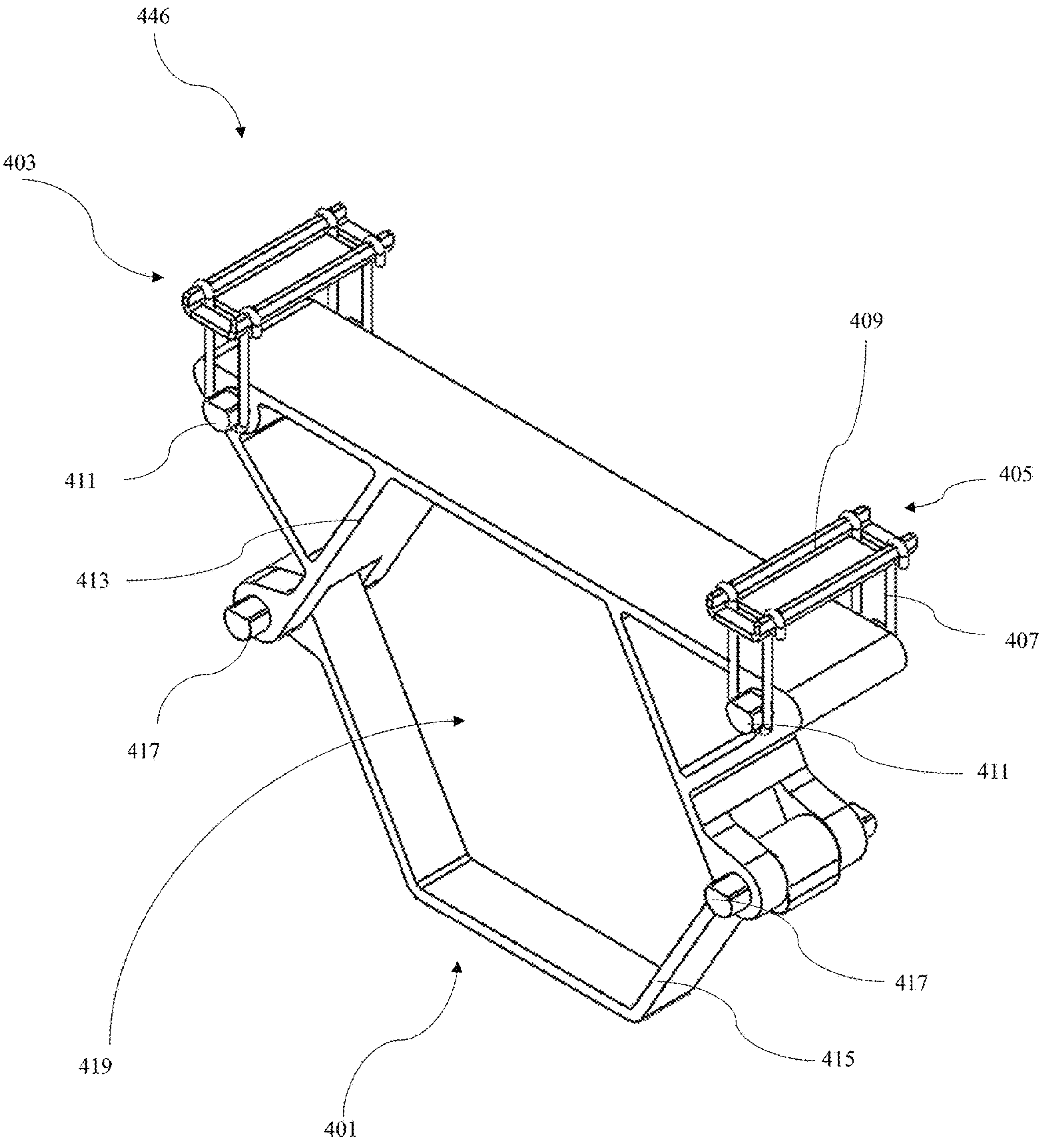
FIG. 16 is a perspective view of the mounting assembly shown in FIG. 15.
Figure 17:
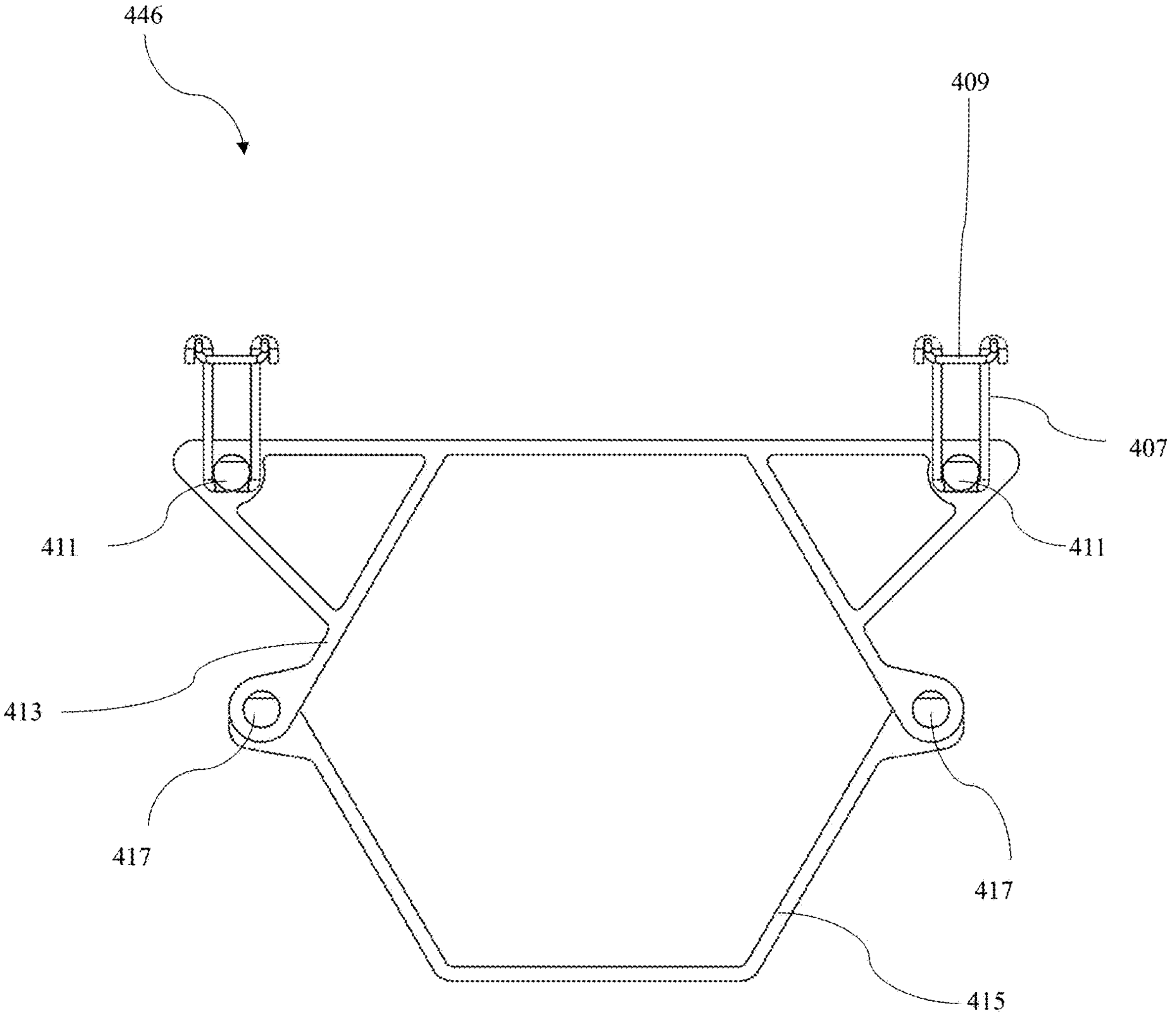
FIG. 17 is a side view of the mounting assembly shown in FIG. 15.

Referring to FIGS. 16 and 17, each of the hangers 403, 405 includes a pair of hanging clips 407 and a clamp bracket 409 that extends between the clips 407. The clamp bracket 409 is sized to be received in one of the elongate slots 148 (shown in FIG. 15) of the module rail 134 to hang the clamping assembly 401 on the module rail 134. A first pair of lock pins 411 connect the hangers 403, 405 to the clamping assembly 401. The hangers 403, 405 are tightened by adjusting the lock pins 411 to clamp the module rail 134 to the clamping assembly 401. For example, as described below, the lock pins 411 have an asymmetrical profile and rotating the lock pins 411 changes a distance between the clamp brackets 409 and the clamping assembly 401.

The clamping assembly 401 includes an upper body 413 and a lower body 415. The upper body 413 and lower body 415 are suitably formed as separate, discrete components, for example by an aluminum extrusion process. A second pair of lock pins 417 connect the upper body 413 to the lower body 415. The upper body 413 and lower body 415 collectively define an opening 419 therein that is shaped in correspondence to a shape of a profile of the torque tube 130 (e.g., a hexagon shape in FIG. 16). In FIG. 16, the first pair of pins 411 connecting the upper body 413 to the hangers 403, 405 and the second pair of pins 417 connecting the upper body 413 to the lower body 415 are each substantially identical.

Figure 35:
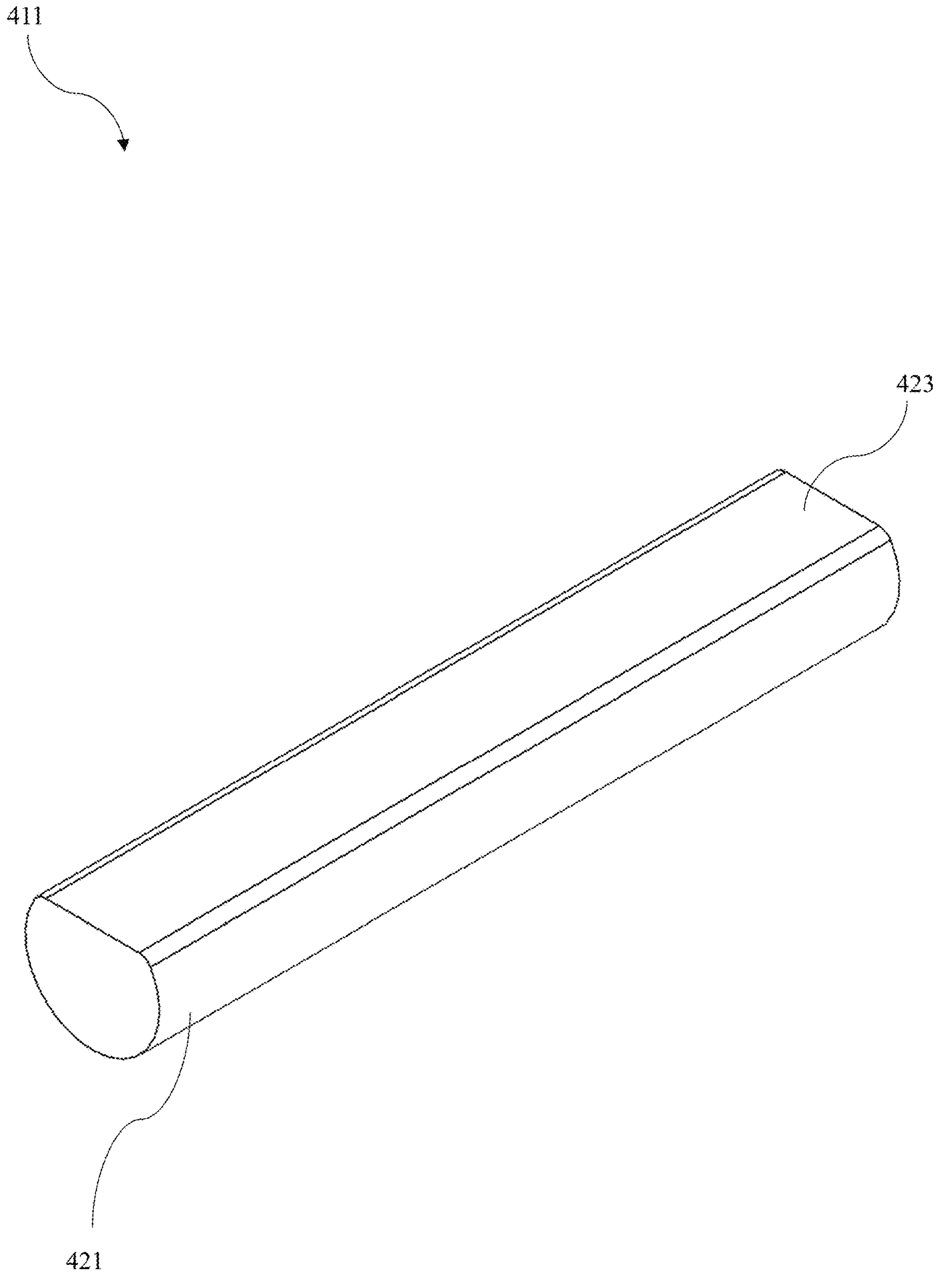
FIG. 35 is a perspective view of a lock pin of the mounting assembly shown in FIG. 15.
Figure 36:
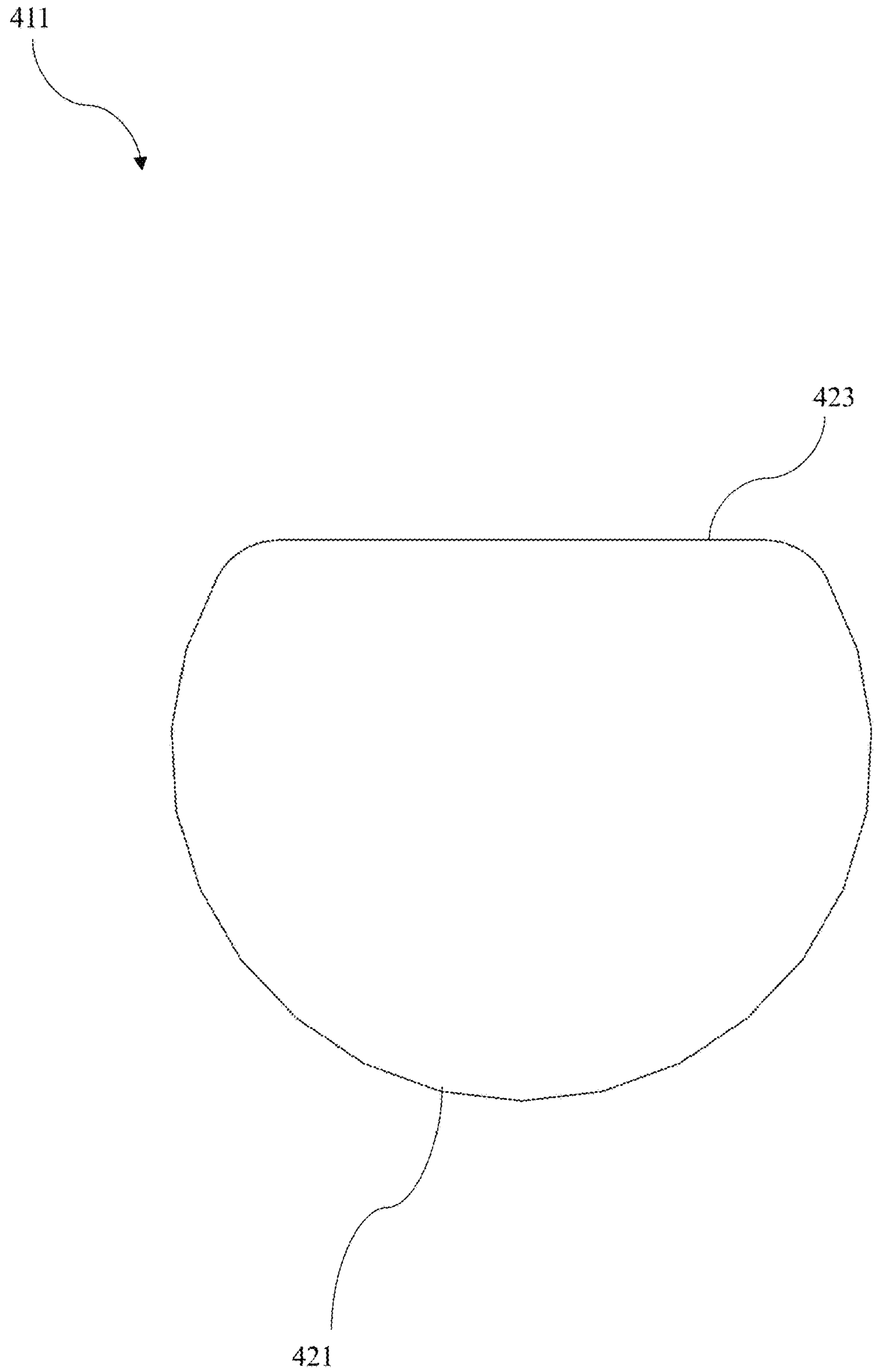
FIG. 36 is a side view of the lock pin shown in FIG. 35.

FIGS. 35 and 36 show isolated views of the lock pin 411. Referring to FIG. 35, the lock pin 411 is generally cylindrically and includes a curved outer surface 421 and a flat planar surface 423 extending along a top side of the pin 411. As shown in FIG. 35, the pin 411 has an asymmetrical hemisphere profile.

Figure 19:
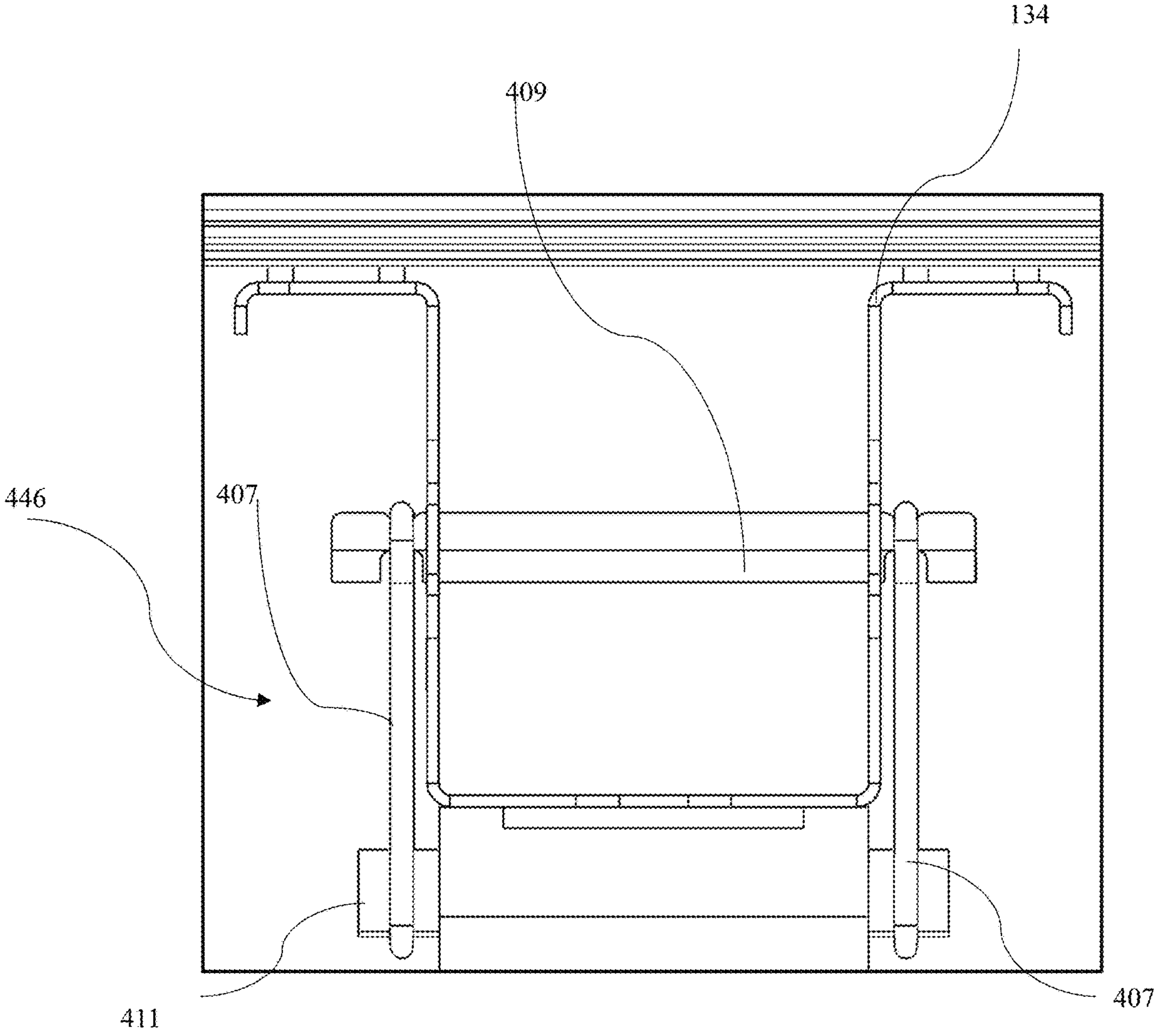
FIG. 19 is an enlarged end view showing a portion of the panel assembly and mounting assembly shown in FIG. 15.
Figure 20:
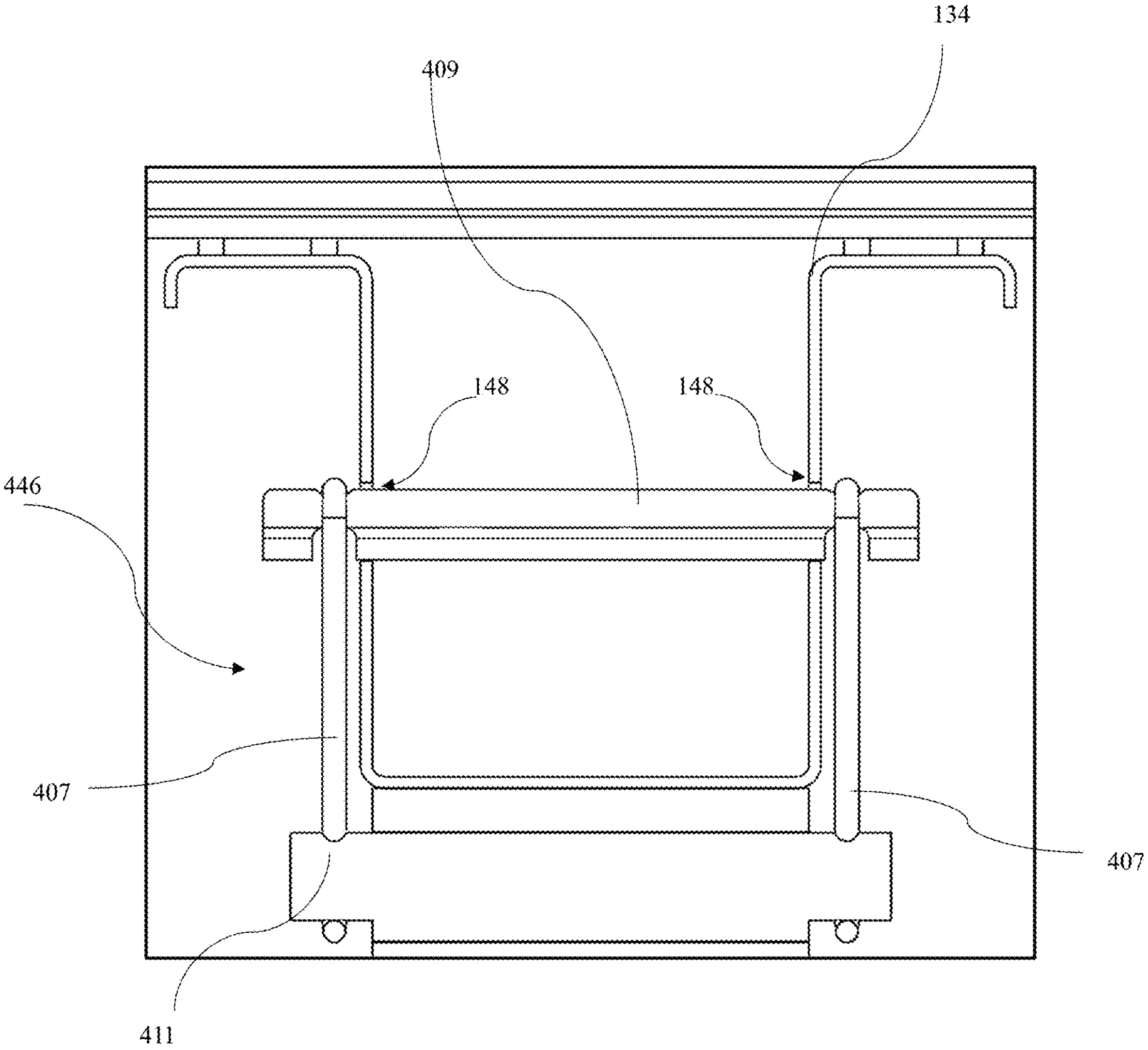
FIG. 20 is a section view showing the portion of the panel assembly and mounting assembly shown in FIG. 19.
Figure 21:
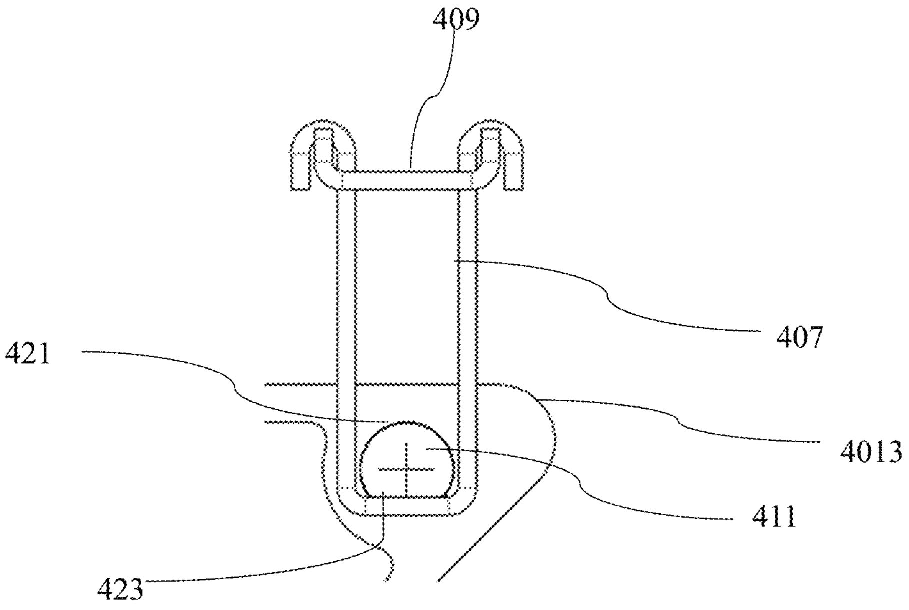
FIG. 21 is an enlarged side view showing a locking device of the mounting assembly of FIG. 15 in an unlocked position.
Figure 22:
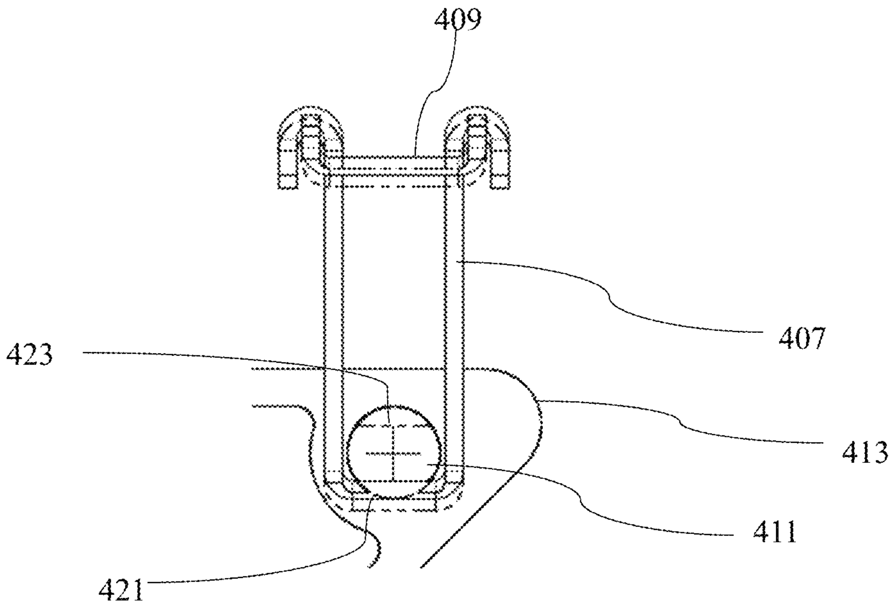
FIG. 22 is an enlarged side view showing the locking device of FIG. 21 in a locked position.

Referring to FIGS. 19 and 20, the clamping bracket 409 extends through the slots 148 in the module rail 134, with the pin 411 extending below the module rail 134. The hanging clips 407 extend between the pins 411 and the clamp bracket 409 and vertically support pins 411 based on a rotational position of the pins 411.

Referring back to FIG. 16, the pins 411, 417 are each adjustable by rotation to transition between an unlocked position, as shown in FIG. 16, and a locked position.

Figure 18:
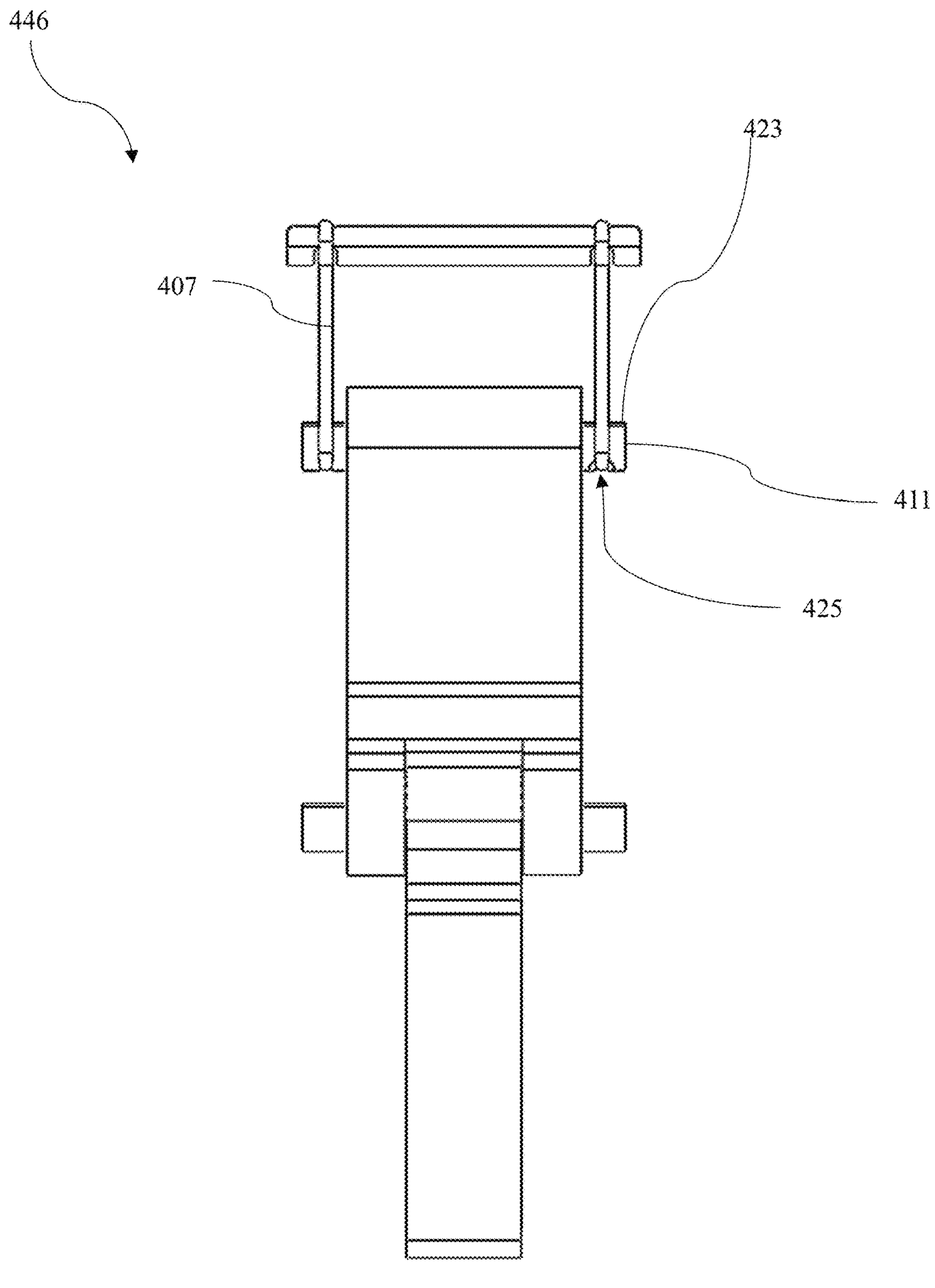
FIG. 18 is an end view of the mounting assembly shown in FIG. 15.

FIG. 22A shows one of the first sets of pins 411 in the unlocked position and FIG. 22B shows the pin 411 in a locked position. Referring to FIG. 22A, in the unlocked position the flat surface 423 of the pin 411 is in contact with the clip 407. When the pin 411 is rotated, such that the rounded surface 421 of the pin 411 contacts the clip 407, tension force in the hanging clip 407 is increased, thereby exerting a downward force to the clamp bracket 409 and/or raising the upper body 413 to the clamp bracket 409, as shown in FIG. 22B. As best shown in FIG. 18, the pins 411 further includes notches 425 defined on the outer surface 421 circumferentially opposite the flat surface 423 such that the hanging clip 407 is retained in the notch 425 when the pin 411 is rotated to the locked position.

Figure 23:
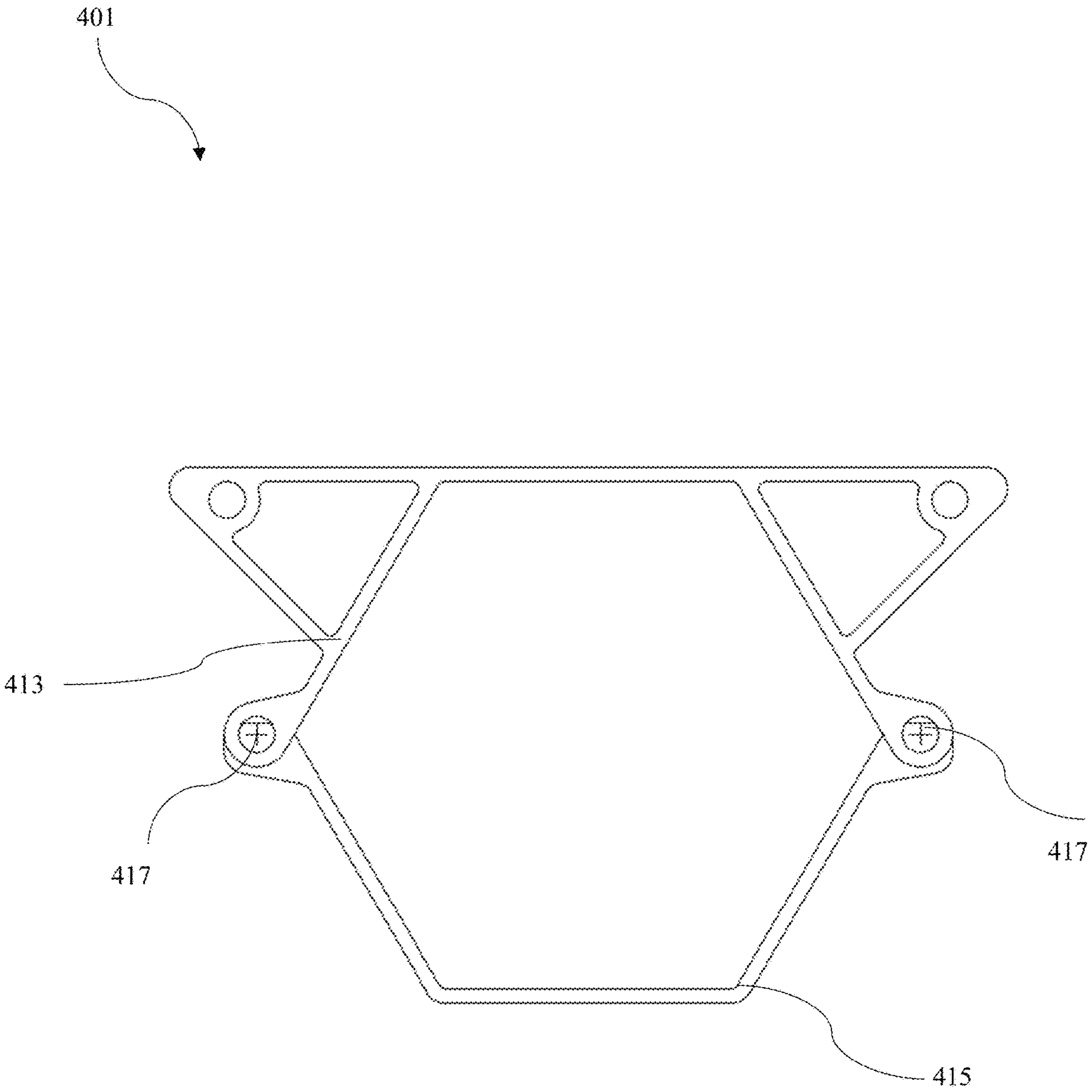
FIG. 23 is a side view showing another locking device of the mounting assembly of FIG. 15 in an unlocked position.
Figure 24:
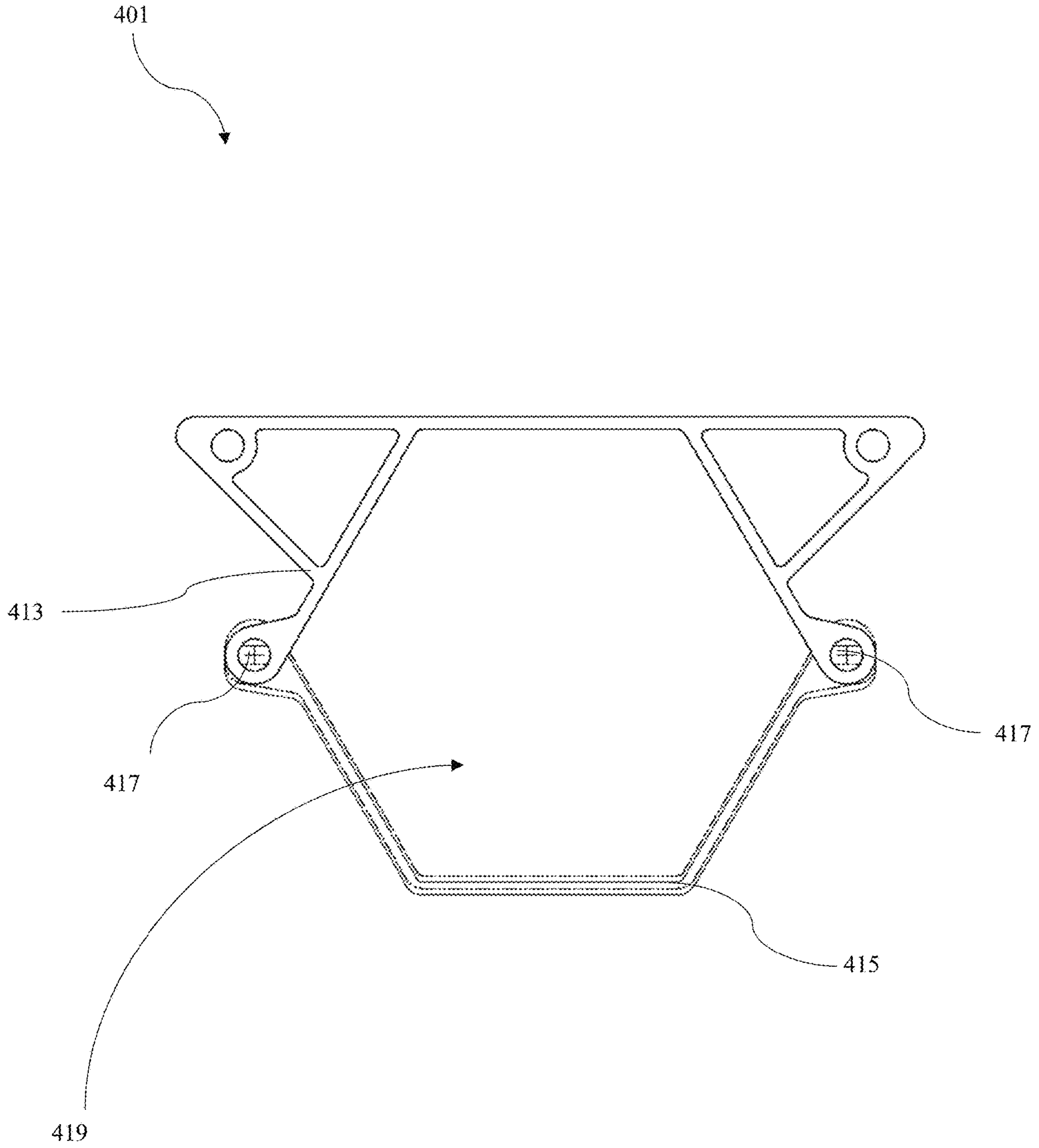
FIG. 24 is a side view showing the locking device of FIG. 23 in a locked position.
Figure 25:
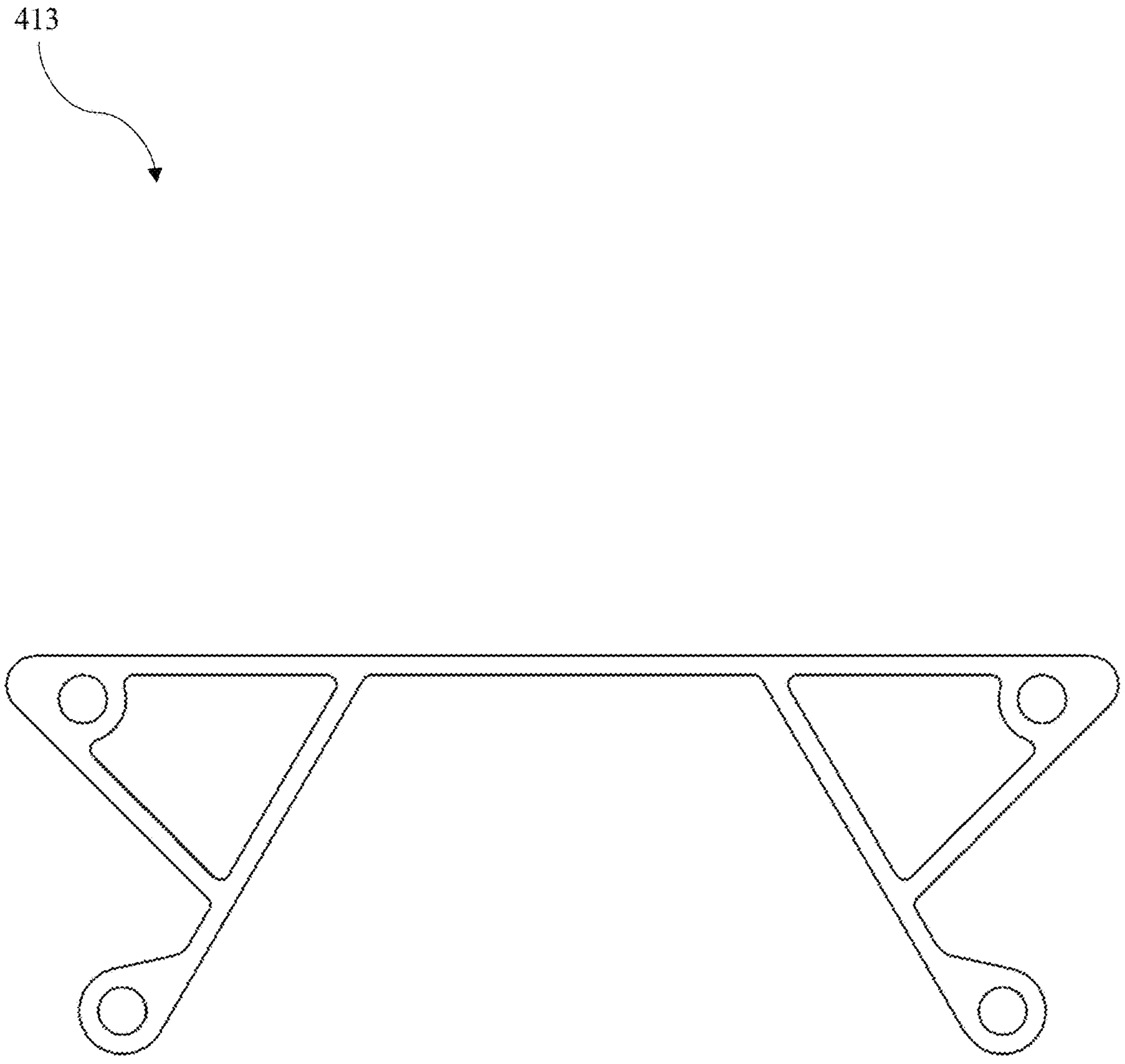
FIG. 25 is a side view of an upper body of the mounting assembly shown in FIG. 15.
Figure 26:
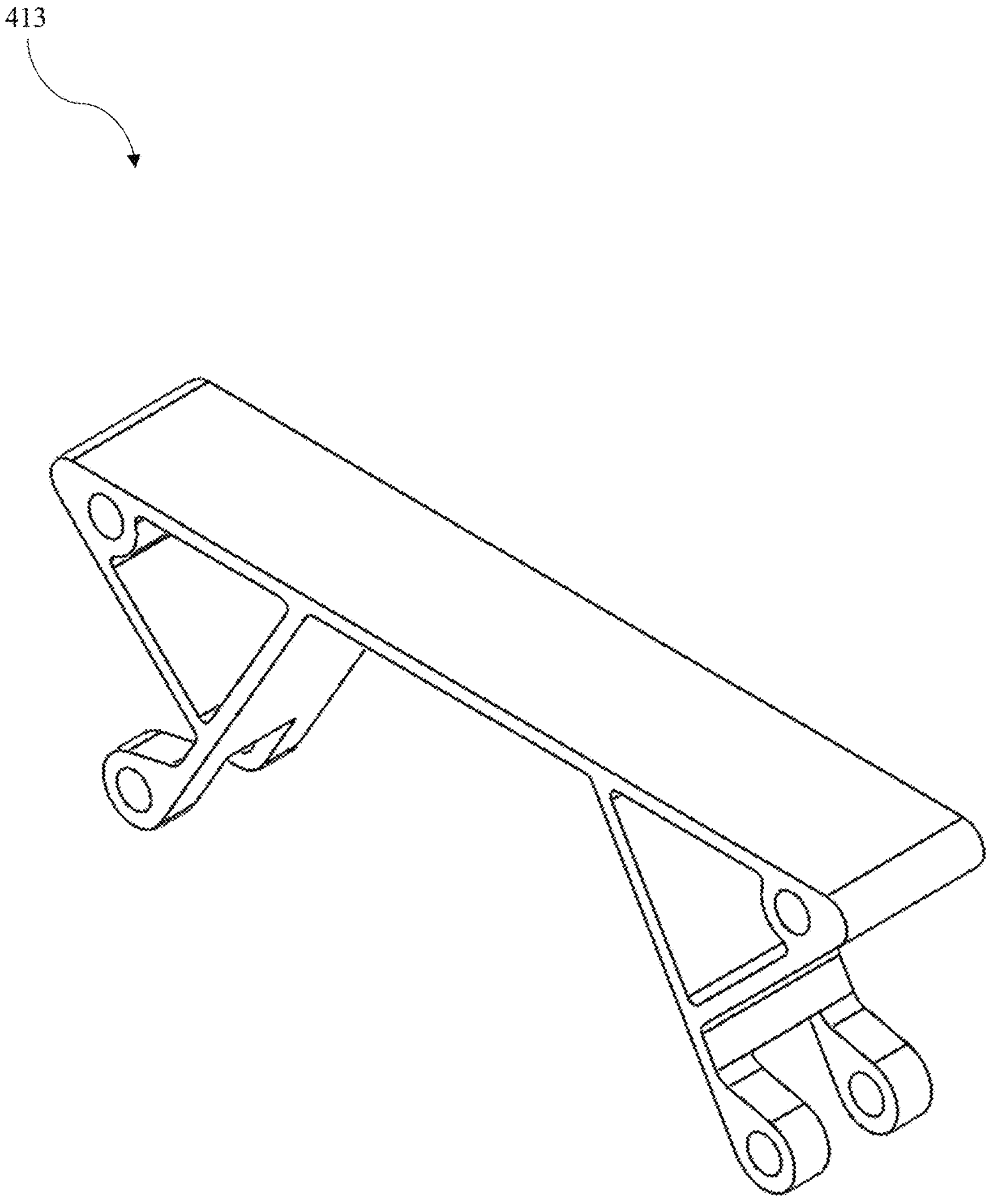
FIG. 26 is a perspective view of the upper body shown in FIG. 25.
Figure 27:
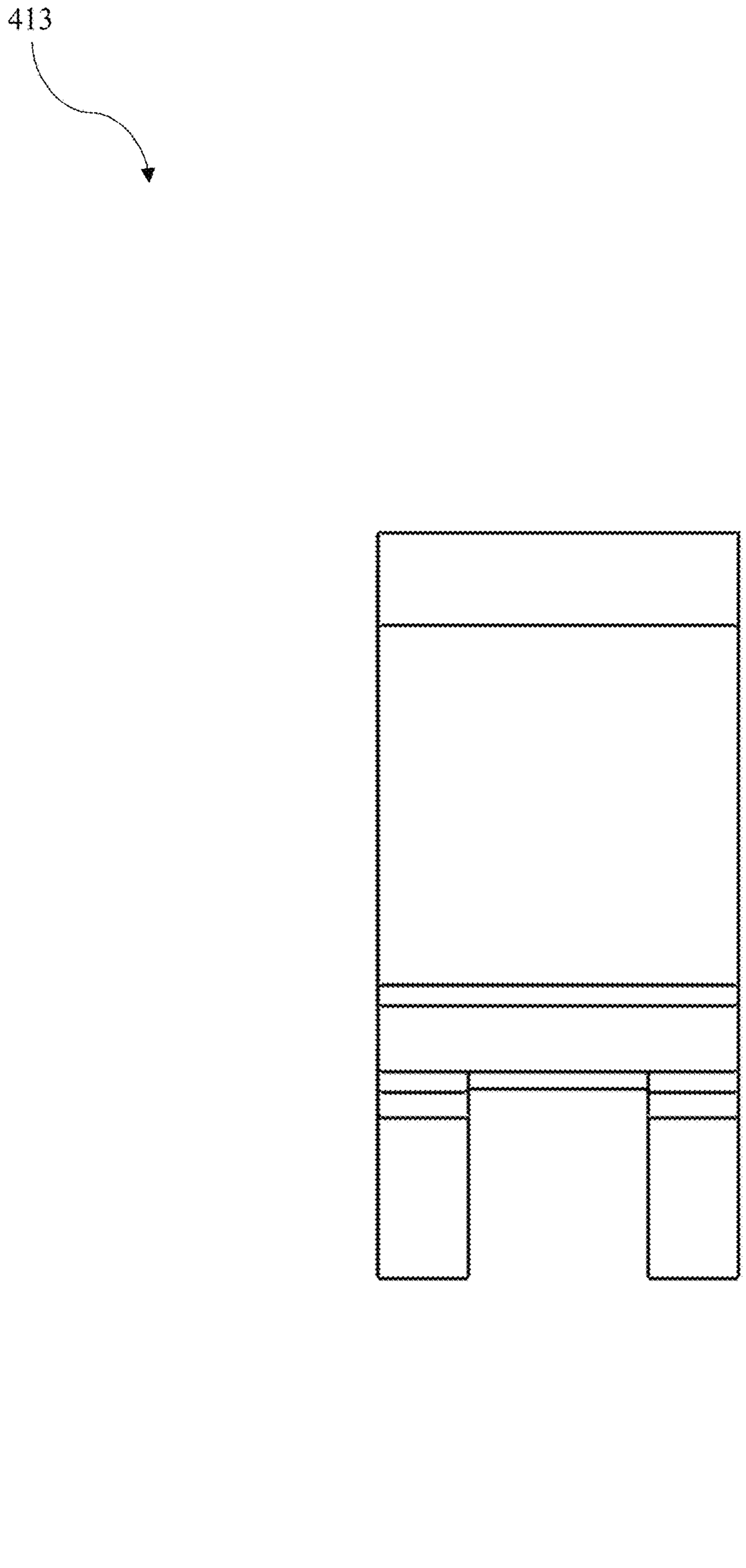
FIG. 27 is an end view of the upper body shown in FIG. 25.
Figure 28:
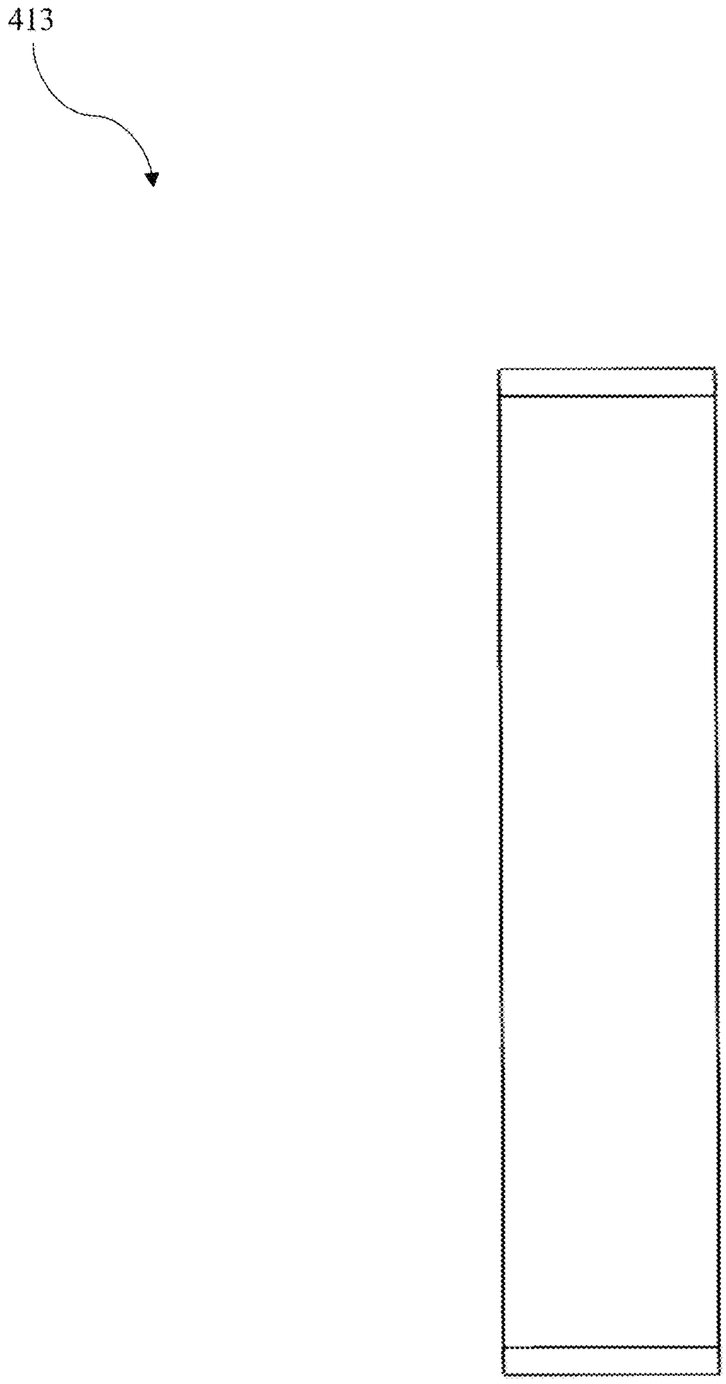
FIG. 28 is a top view of the upper body shown in FIG. 25.

FIG. 23 shows the upper body 413 and the lower body 415 with the second lock pins 417 in an unlocked position. FIG. 24 shows the upper body 413 and lower body 415 with the pins 417 rotated to the locked position. As shown in FIG. 24, when the lock pins 417 are rotated to the locked position, the lower body is pulled upward toward the upper body to provide a clamping force on the torque tube 130 (shown in FIG. 3). The second pair of lock pins 417 each form hinged pivot point that is adjustable to change the size and shape (or at least one of the size and shape) of the opening 419 defined between the upper and lower bodies to clamp the bodies on the torque tube.

Figure 29:
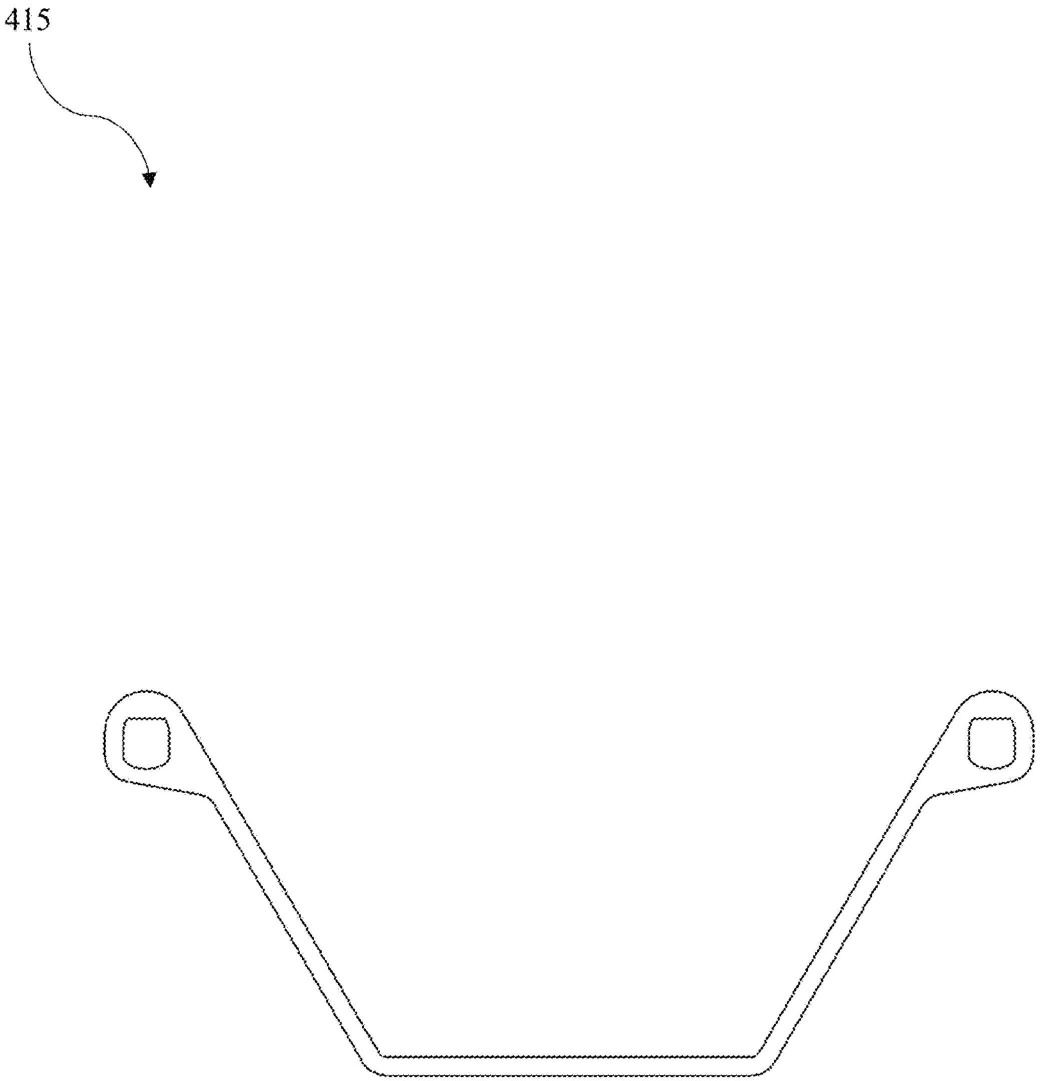
FIG. 29 is a side view of a lower body of the mounting assembly shown in FIG. 15.
Figure 30:
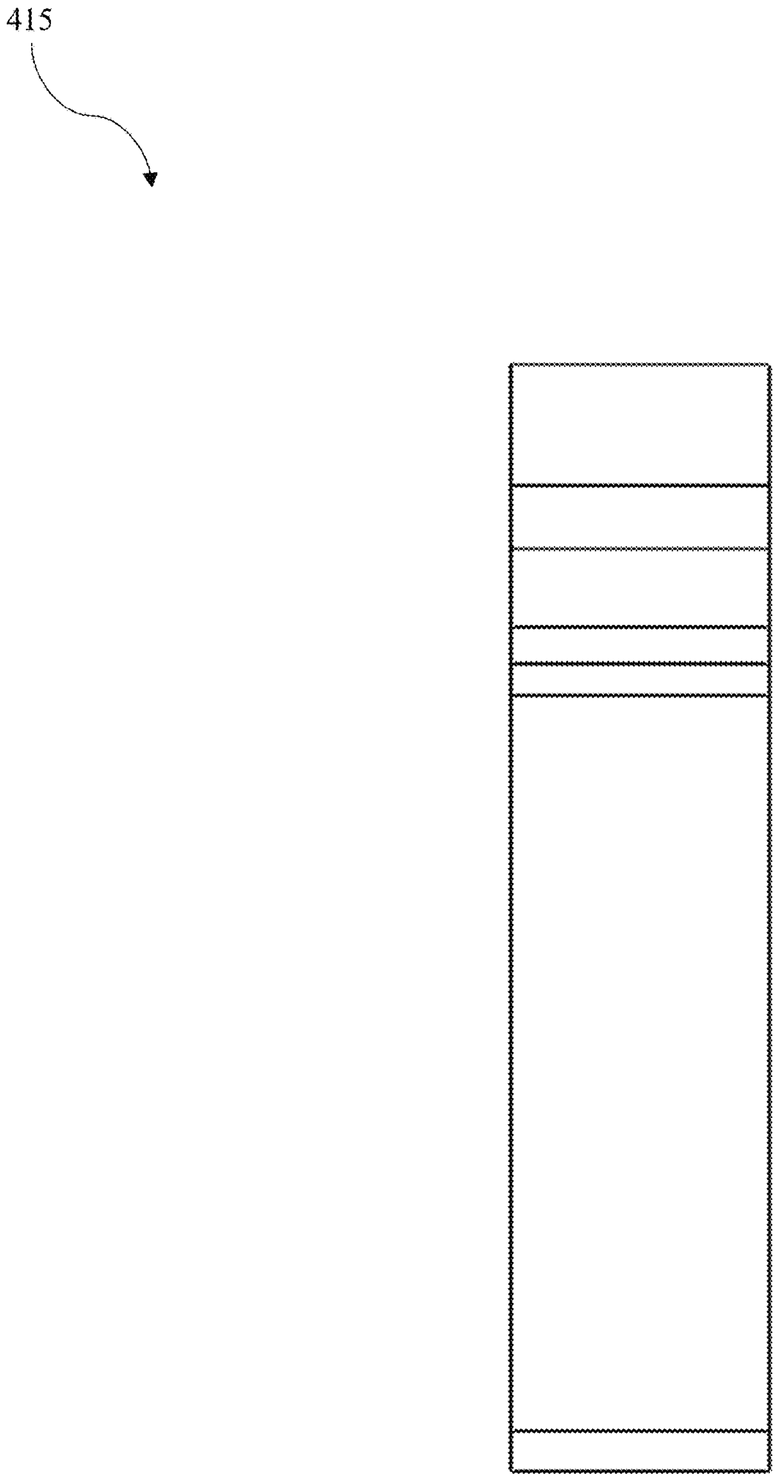
FIG. 30 is an end view of the lower body shown in FIG. 29.
Figure 31:
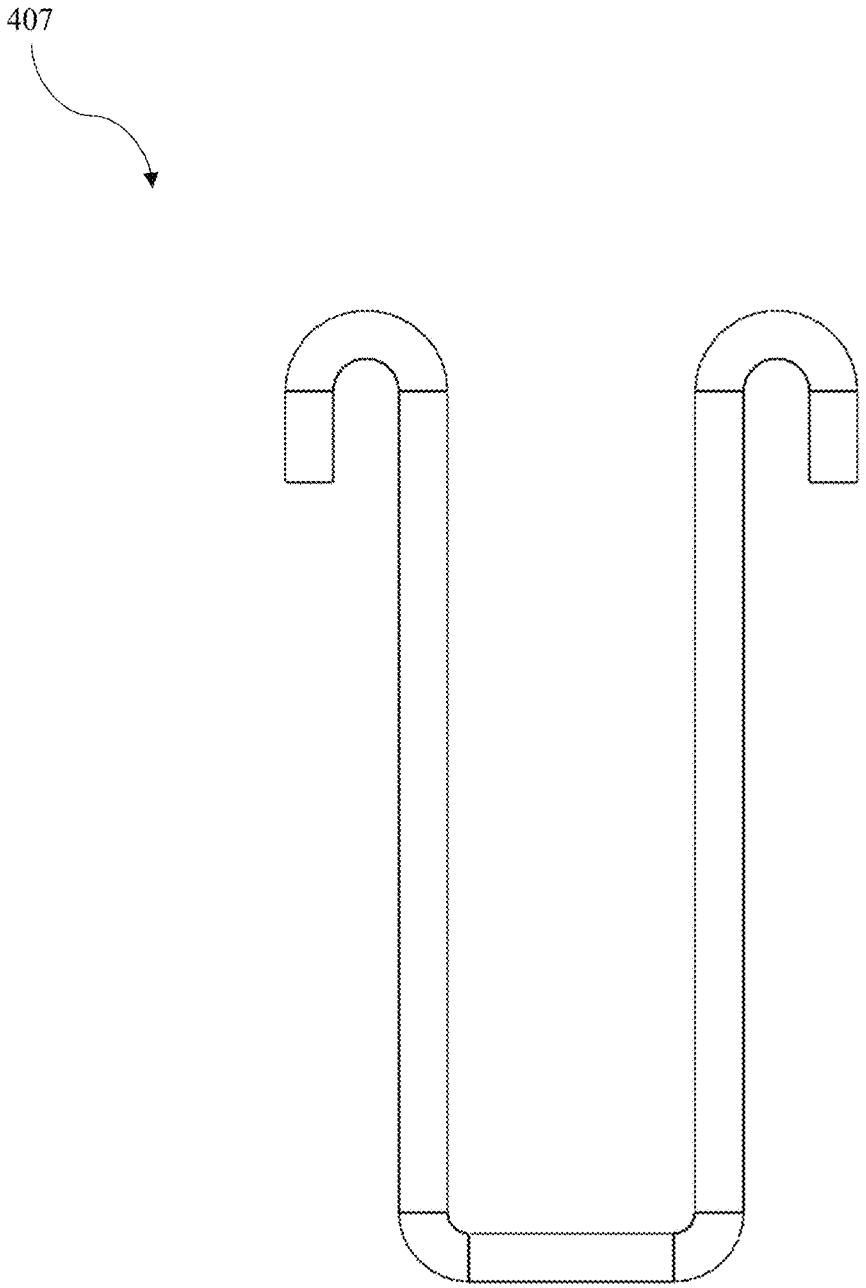
FIG. 31 is a side view of a hanger of the mounting assembly shown in FIG. 15.
Figure 32:
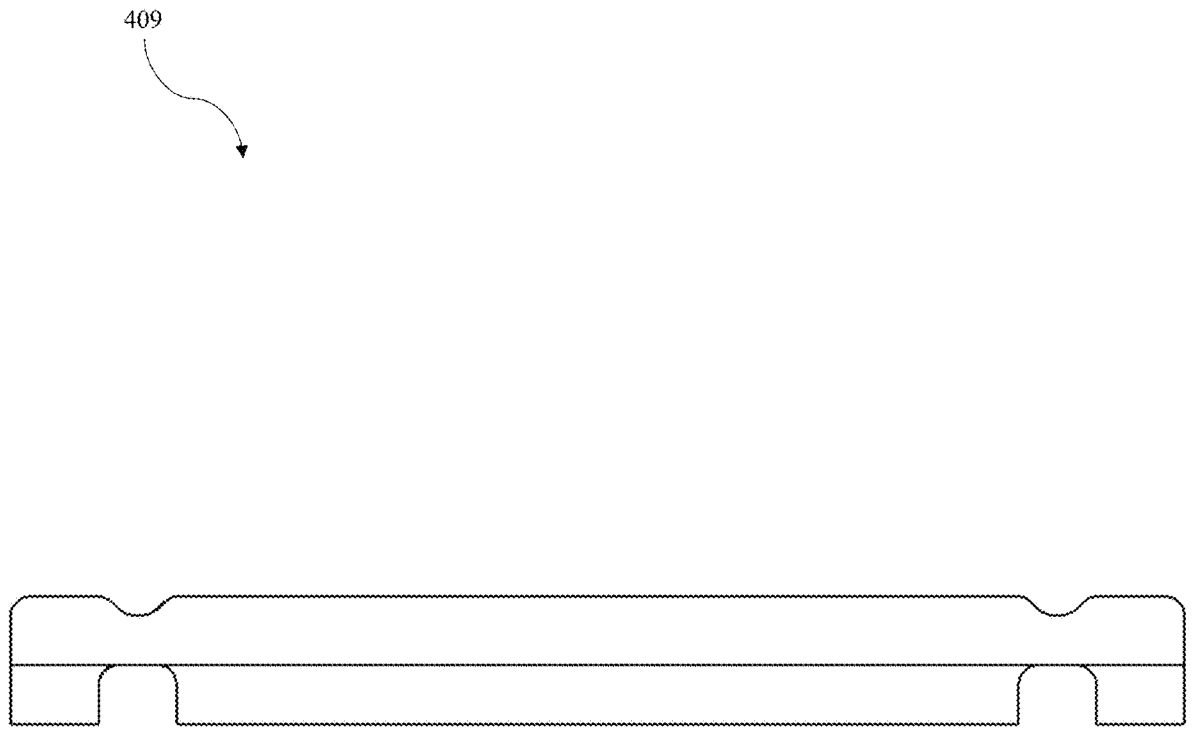
FIG. 32 is a side view of a clamp bracket of the mounting assembly shown in FIG. 15.
Figure 33:
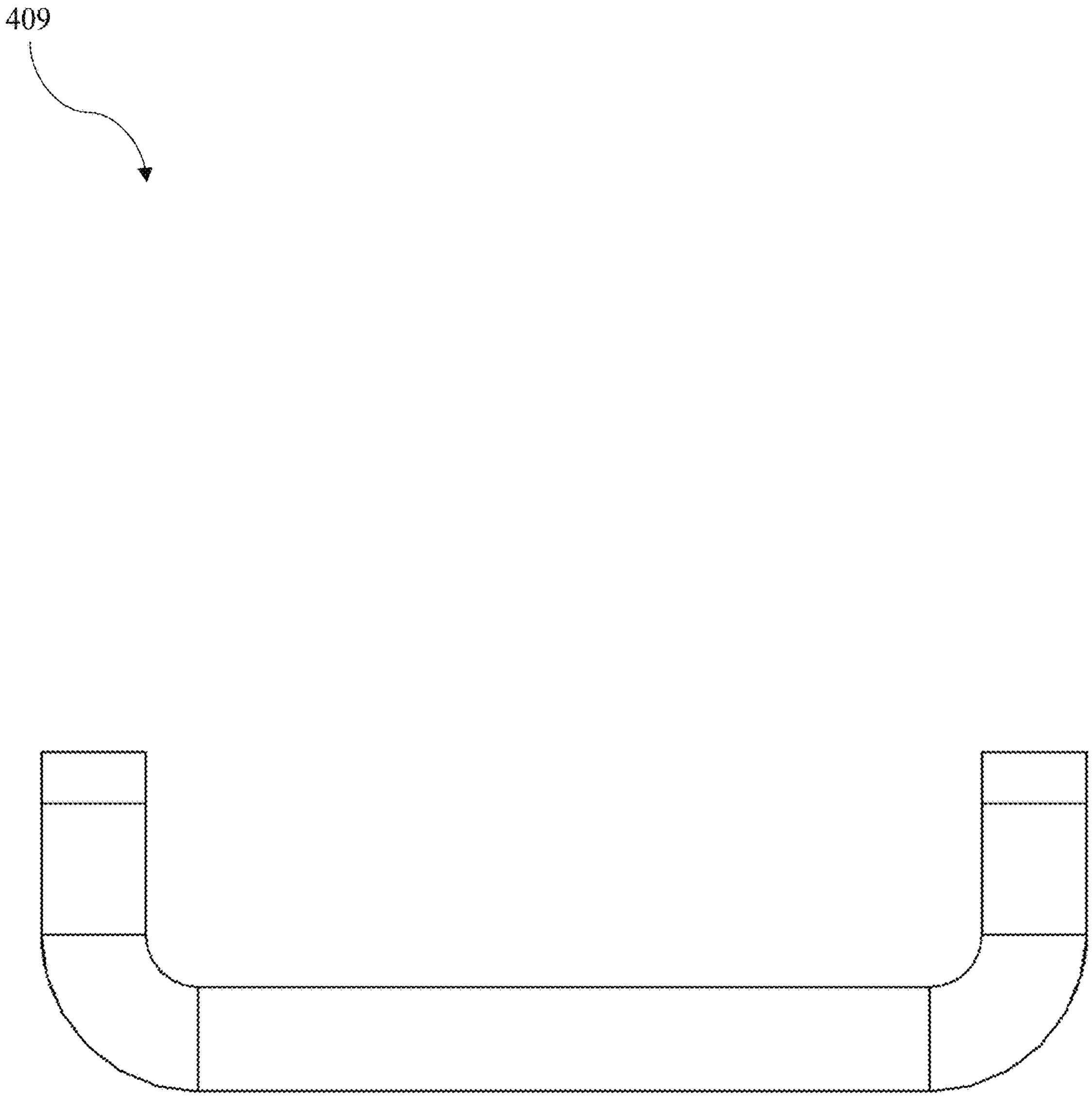
FIG. 33 is an end view of the clamp bracket shown in FIG. 32.
Figure 34:
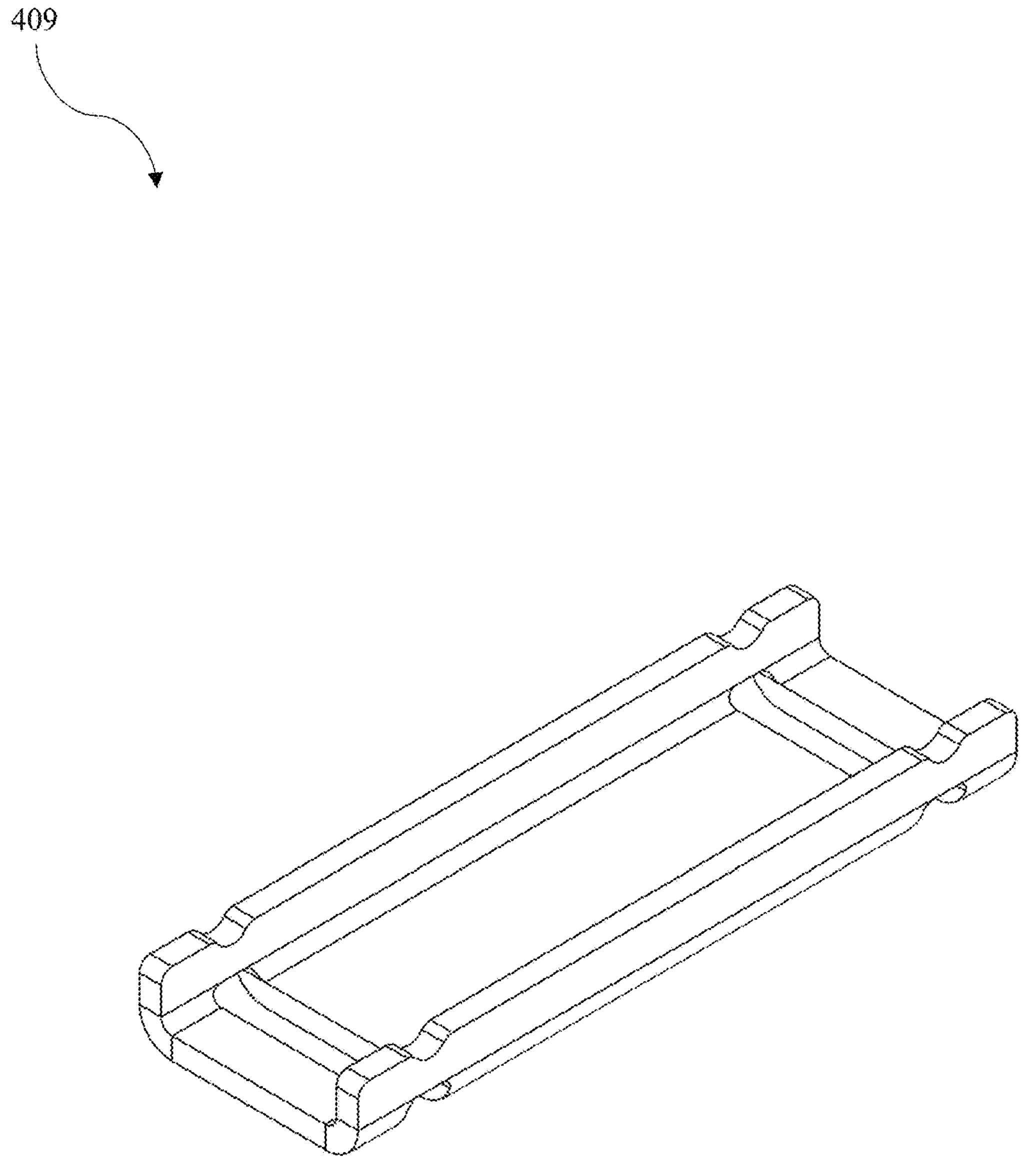
FIG. 34 is a perspective view of the clamp bracket shown in FIG. 32.

FIGS. 25-28 show additional views of the upper body 413. FIGS. 29 and 30 show additional views of the lower body 415. FIG. 31 shows an isolated view of the hanging clip 407. FIGS. 32-34 show additional views of the clamp bracket. FIGS. 35 and 36 show additional views of the lock pin 411.

Figure 37:
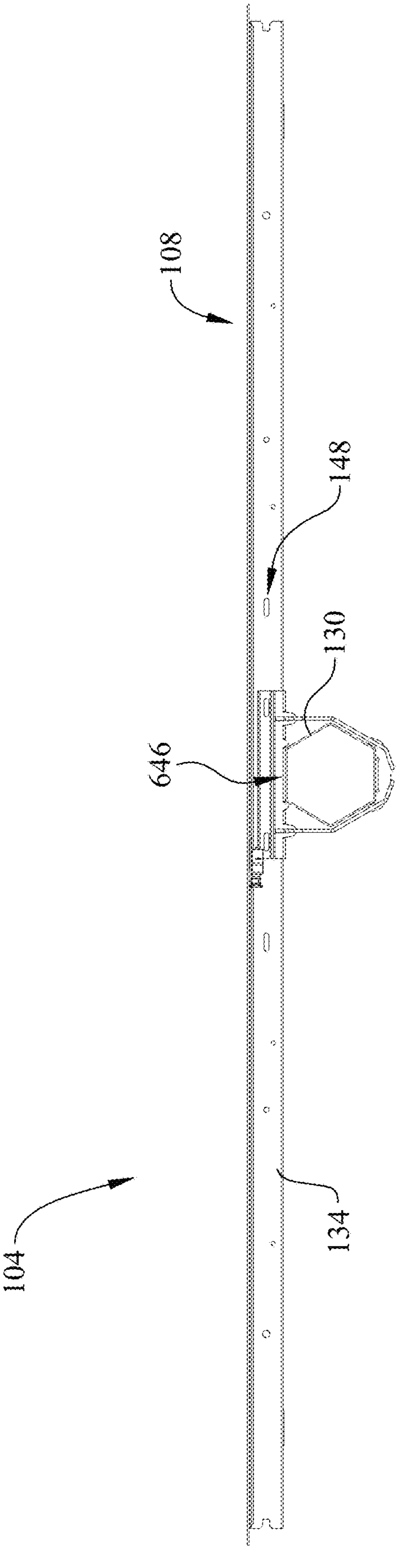
FIG. 37 is a side view of the panel assembly shown in FIG. 2 and another embodiment of a mounting assembly for connecting the panel assembly to a torque tube of the solar tracker system shown in FIG. 1.

FIGS. 37-42 show another alternative mounting assembly 646 for mounting the module rail 134 on the torque tube 130. The mounting assembly 646 is substantially similar to the mounting assembly 146, shown in FIG. 3, except as otherwise described differently herein. For example, as shown in FIG. 37, the mounting assembly 646 extends around the torque tube 130 and attaches to the rail 134 of the panel assembly 104.

Figure 38:
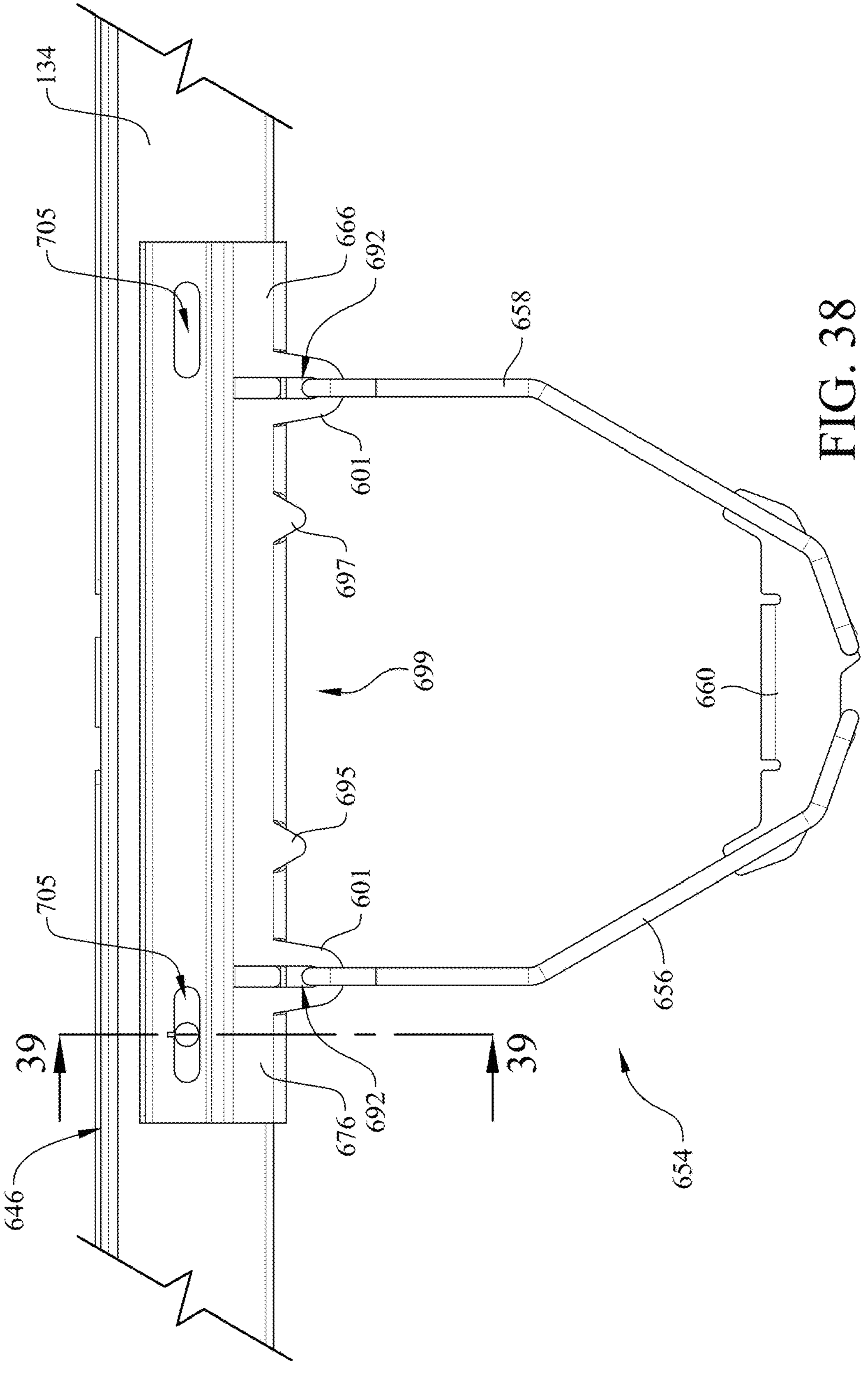
FIG. 38 is an enlarged side view of the mounting assembly shown in FIG. 37 and a module rail of the panel assembly shown in FIG. 37.

Referring to FIG. 38, the mounting assembly 646 and the module rail 134 are shown. The mounting assembly 646 includes a saddle mount 666 and a clip assembly 654. The clip assembly 654 is attached to the saddle mount 666 and includes a pair of clips 656, 658 and a cam plate 660.

Figure 42:
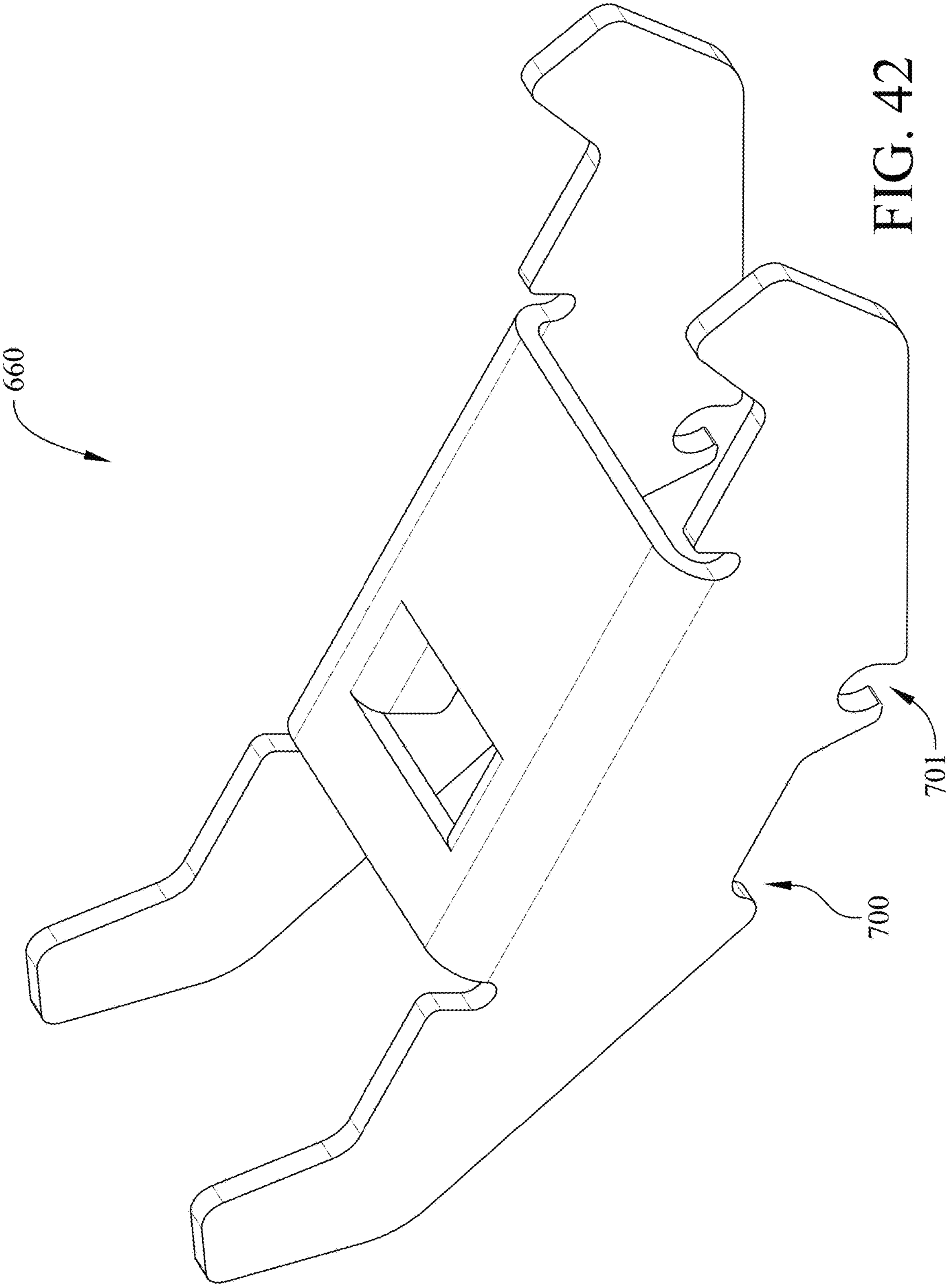
FIG. 42 is a perspective view of a cam plate of the mounting assembly shown in FIG. 37.

As best shown in FIG. 42, The cam plate 660 is substantially similar to the cam plate 160 (shown in FIG. 4), except that the cam plate 660 does not include two installation notches 198 and two lock notches 200. Instead, the cam plate 660 includes a single lock notch 700 and a closed notch 701. As shown in FIG. 38, the first clip 656 is removably receivable in the lock notch 700 and the second clip 658 is fixed in position within the closed notch 701. The cam plates 160, 660 may alternatively be used with either mounting assembly 146, 646 described herein.

Referring to FIG. 38, the saddle mount 666 is shaped to be seated on the torque tube 130 (shown in FIG. 37). The saddle mount includes a pair of projections 695, 697 that project downward and define a recess 699 between the projections 695, 697. The recess 699 is sized to receive a portion of the torque tube 130 (shown in FIG. 3) with the projections 695, 697 contacting the torque tube 130.

Figure 40:
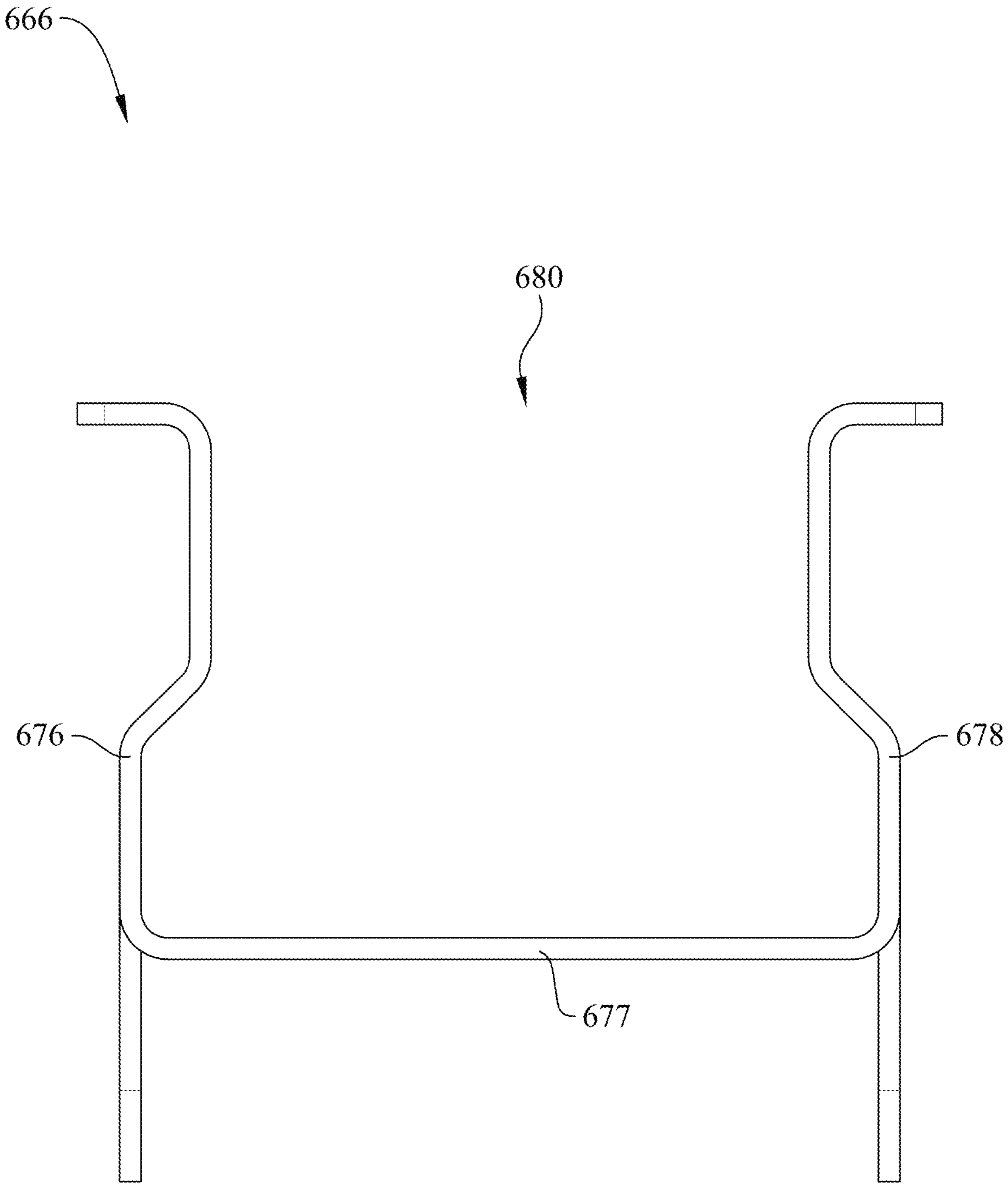
FIG. 40 is an end view of a saddle of the mounting assembly shown in FIG. 37.
Figure 41:
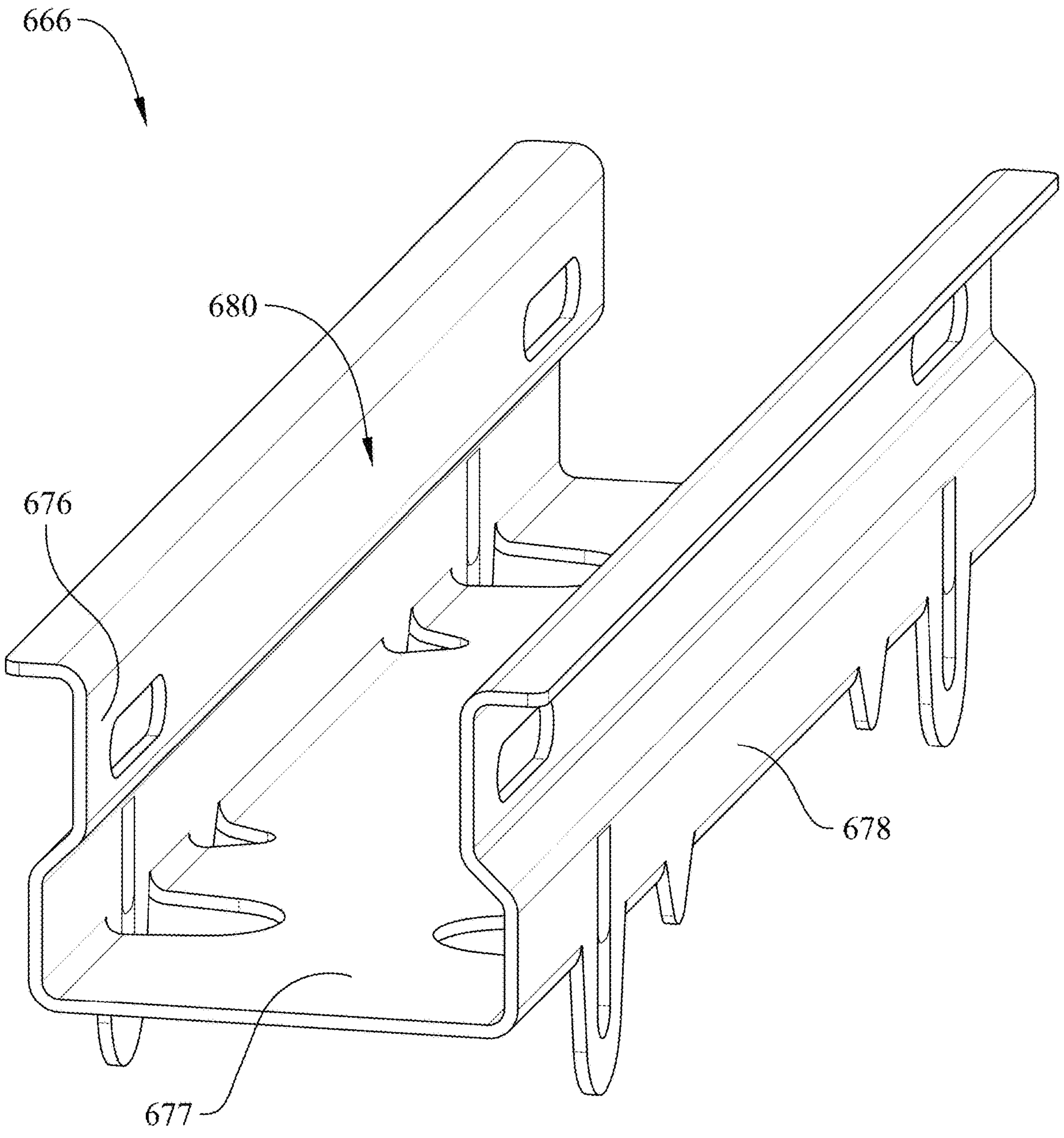
FIG. 41 is a perspective view of the saddle shown in FIG. 40.

As shown in FIGS. 40 and 41, the saddle mount 666 includes a first sidewall 676, a second sidewall 678, and a base wall 677 extending from the first sidewall 676 to the second sidewall 678. The first sidewall 676 and the second sidewall 678 define a gap 680 therebetween. The gap 680 is sized to receive the support rail 134 (shown in FIG. 38).

Referring back to FIG. 38, the clip assembly 654 is attached to the saddle mount 666. The saddle mount 666 includes unitarily formed feet 601 defining slots 692 therein. The clips 656, 658 each extend through a respective one of the slots 692 attaching the clips 656, 658 to the feet 601.

The saddle mount 666 defines slots 705 in each of the first sidewall 676 and the second sidewall 678. The saddle slots 705 are sized and positioned for alignment with the elongate slots 148 defined in the module rail 134. The first sidewall 676 and the second sidewall 678 each define two slots 705 in alignment with slots 705 on the opposed sidewall (i.e., the saddle 666 defines four slots 705 in total). In other embodiments, the saddle 666 includes any suitable number of slots 705.

Figure 39:
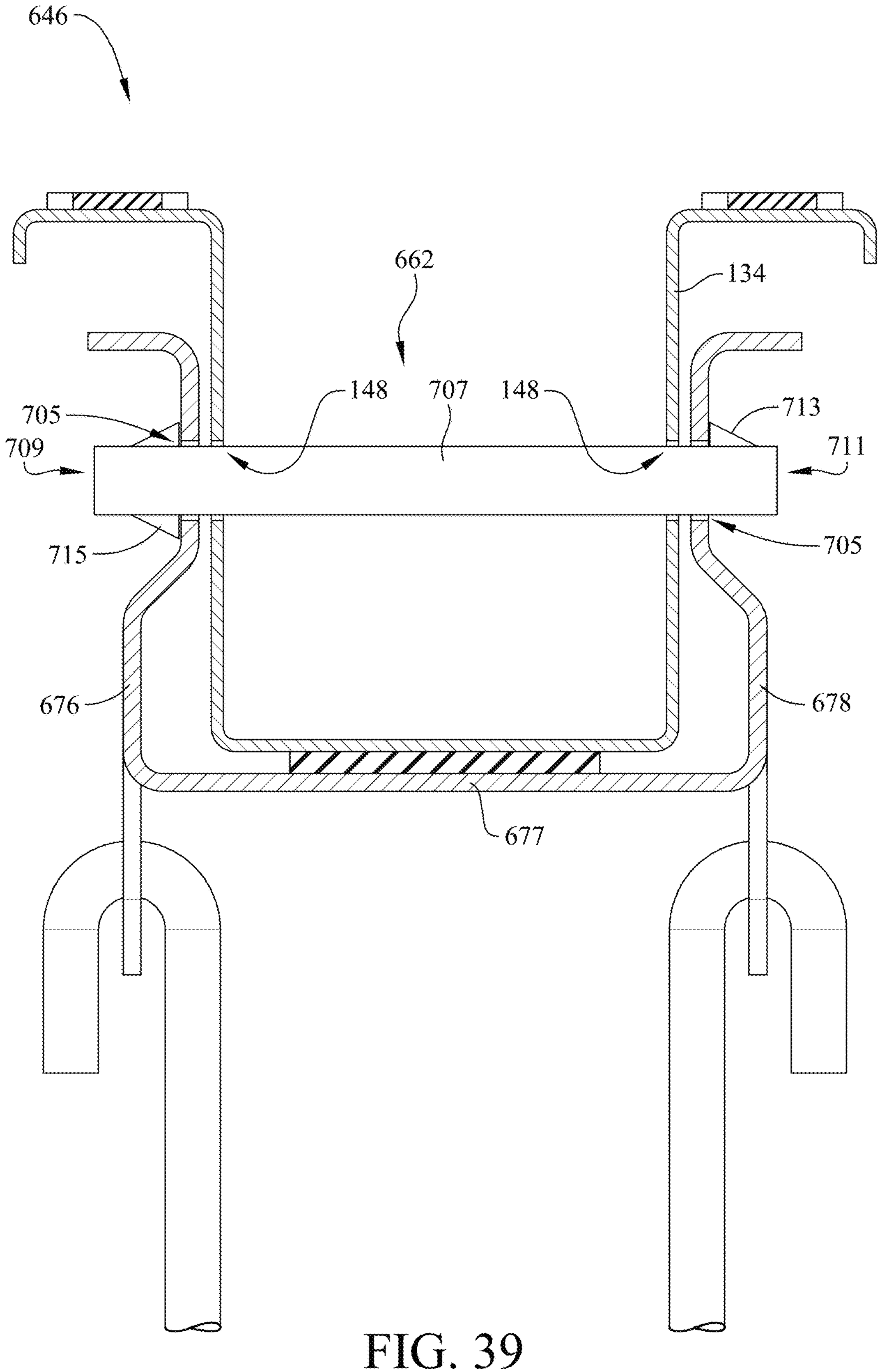
FIG. 39 is a cross section view of a portion of the mounting assembly and the rail shown in FIG. 38.

As shown in FIG. 39, the mounting assembly 646 further includes a locking device 662 that is shaped to engage the first sidewall 676 and the second sidewall 678. The locking device 662 is insertable through the saddle slots 705 in the saddle 666 and the slots 148 in the module rail 134 to connect the clip assembly 654 to the support rail 134.

The locking device 662 includes a body 707 defining a proximal end 709 and a distal end 711. The body 707 has a shape corresponding to a shape of the slots 705, and in other embodiments may have any suitable shape. The locking device 662 includes a flexing tip 713 at the distal end 711 projecting radially outward from the body 707. The tip 713 is biased to flex to an outward position, as shown in FIG. 39, to engage the second sidewall 678 and restrict longitudinal movement of the locking device 662 relative to the saddle mount 666 and the module rail 134 (i.e., movement of the locking device to the left of the page in FIG. 39). The tip 713 is resiliently flexible radially inwards relative to body 707 when the distal end 711 is inserted into each of the slots 148, 705. In other embodiments, the locking device 662 may include any other suitable locking feature, such as an asymmetrical "key-shape" profile, that enables the locking device 662 to function as described herein.

The locking device 662 further includes a stop 715 positioned at the proximal end 709. The stop 715 extends radially outward from the body 707 and engages first sidewall 676, when the locking device 662 is inserted. The stop 715 restricts longitudinal movement of the locking device 662 relative to the saddle mount 666 and the module rail 134 (i.e., movement of the locking device 662 to the right of the page in FIG. 39).

The terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A mounting assembly for securing a solar panel assembly to a rotatable tube of a solar tracker, the solar panel assembly including a support rail on a back side of the solar panel assembly, the support rail defining a rail slot, the mounting assembly comprising:

a saddle including a first sidewall defining a first slot extending therethrough, a second sidewall defining a second slot extending therethrough and aligned with the first slot, and a base wall extending between the first sidewall and the second sidewall, the first sidewall and the second sidewall defining a gap sized to receive the support rail, wherein the first sidewall and the second sidewall taper inward from the base wall such that the gap has a first width proximate the base wall that is greater than a second width of the gap at the first slot and the second slot;

a clip assembly sized to extend around the rotatable tube, the clip assembly including a clip and a cam plate; and a locking device shaped to engage the first sidewall and the second sidewall, the locking device being sized to be inserted into the first slot, the rail slot, and the second slot to secure the support rail to the saddle, the cam plate being shaped to receive the clip under tension and clamp the support rail to the rotatable tube.

2. The mounting assembly of claim 1, wherein the locking device includes a stop and a distal tip, the distal tip sized to be inserted through the rail slot and the stop contacting the first sidewall.

3. The mounting assembly of claim 1, wherein the clip is attached to the saddle.

4. The mounting assembly of claim 1, wherein the cam plate includes an exterior surface defining a notch therein, the notch shaped to receive the clip under tension.

5. The mounting assembly of claim 1, wherein the saddle includes a pair of projections extending outwards of the base wall, the pair of projections spaced to engage the rotatable tube and defining a recess sized to receive at least a portion of the rotatable tube.

6. The mounting assembly of claim 1, wherein the saddle includes a first foot that is coplanar with the first sidewall and a second foot that is coplanar with the second sidewall and aligned with the first foot, the first foot and the second foot each defining a clip slot therein and extending below the base wall, wherein the clip extends through the clip slots in the first foot and the second foot and engages the cam plate.

7. The mounting assembly of claim 6, wherein a distance between the first foot and the second foot is the same as the first width.

8. The mounting assembly of claim 6, wherein the locking device engages outer surfaces of the first sidewall and the second sidewall at positions inward of the first foot and the second foot, respectively.

9. The mounting assembly of claim 6, wherein the clip slot on the first foot extends at least partially along the first sidewall and wherein the clip slot on the second foot extends at least partially along the second sidewall.

10. The mounting assembly of claim 1, wherein the cam plate includes a lock notch and a closed notch, wherein the clip assembly comprises an additional clip, the clip and the additional clip each being attached to the saddle, wherein the clip is removably received in the lock notch and the additional clip is received in the closed notch.

11. The mounting assembly of claim 1, wherein the locking device includes a body and a stop extending radially outward from the body to engage the first sidewall and restrict longitudinal movement of the locking device.

12. A solar tracker system comprising:
- a rotatable tube defining a longitudinal axis;
- a solar panel module including a support rail on a back side of the solar panel module, the support rail including a rail slot; and
- a mounting assembly securing the solar panel module to the rotatable tube, the mounting assembly comprising:
  - a saddle including a first sidewall defining a first slot extending therethrough, a second sidewall defining a second slot extending therethrough and aligned with the first slot, and a base wall extending between the first sidewall and the second sidewall, the first sidewall and the second sidewall defining a gap sized to receive the support rail, wherein the first sidewall and the second sidewall taper inward from the base wall such that the gap has a first width proximate the base wall that is greater than a second width of the gap at the first slot and the second slot;
  - a clip assembly sized to extend around the rotatable tube, the clip assembly including a clip and a cam plate; and
  - a locking device shaped to engage the first sidewall and the second sidewall, the locking device being sized to be inserted into the first slot, the rail slot, and the second slot to secure the support rail to the saddle, the cam plate being shaped to receive the clip under tension and clamp the support rail to the rotatable tube.

13. The solar tracker system of claim 12, wherein the locking device includes a stop and a distal tip, the distal tip sized to be inserted through the slot and the stop contacting the first sidewall.

14. The solar tracker system of claim 12, wherein the clip is attached to the saddle.

15. The solar tracker system of claim 12, wherein the cam plate includes an exterior surface defining a notch therein, the notch shaped to receive the clip under tension.

* * * * *